US012588010B2

(12) United States Patent
Zang et al.

(10) Patent No.: US 12,588,010 B2
(45) Date of Patent: Mar. 24, 2026

(54) SERVICE INFORMATION FOR V2X SERVICE COORDINATION IN OTHER FREQUENCY SPECTRUM

(71) Applicant: Telefonaktiebolaget LM Ericsson (publ), Stockholm (SE)

(72) Inventors: Yunpeng Zang, Wuerselen (DE); Erika Tejedor, Sundbyberg (SE); Sverker Magnusson, Stockholm (SE); Carl Anders Fagerholt, Mölndal (SE); Friedhelm Ramme, Jülich (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 479 days.

(21) Appl. No.: 17/421,789

(22) PCT Filed: Jan. 18, 2019

(86) PCT No.: PCT/EP2019/051270
§ 371 (c)(1),
(2) Date: Jul. 9, 2021

(87) PCT Pub. No.: WO2020/147968
PCT Pub. Date: Jul. 23, 2020

(65) Prior Publication Data
US 2022/0104200 A1 Mar. 31, 2022

(51) Int. Cl.
*H04W 72/0453* (2023.01)
*H04W 4/40* (2018.01)
*H04W 72/02* (2009.01)

(52) U.S. Cl.
CPC ......... *H04W 72/0453* (2013.01); *H04W 4/40* (2018.02); *H04W 72/02* (2013.01)

(58) Field of Classification Search
None
See application file for complete search history.

(56) References Cited

U.S. PATENT DOCUMENTS

| | | | | |
|---|---|---|---|---|
| 11,246,146 B2 * | 2/2022 | Lee | ......................... | H04W 4/40 |
| 12,047,934 B2 * | 7/2024 | Cao | ................... | H04W 72/0466 |

(Continued)

FOREIGN PATENT DOCUMENTS

| | | |
|---|---|---|
| CN | 109076325 A | 12/2018 |
| EP | 3340704 A1 | 6/2018 |

(Continued)

OTHER PUBLICATIONS

IEEE, Draft Standard for Wireless Access in Vehicular Environments (WAVE)—Networking Services, P1609.3v3/D5, Oct. 2015.

(Continued)

*Primary Examiner* — Chirag G Shah
*Assistant Examiner* — Suk Jin Kang
(74) *Attorney, Agent, or Firm* — Weisberg I.P. Law, P.A.

(57) ABSTRACT

A V2X communication device (41, 42, 43) receives service information (402, 403, 404) in a first frequency spectrum. The service information indicates availability of at least one V2X communication service in a second frequency spectrum. Based on the received service information (402, 403, 404), the V2X communication device (41, 42, 43) controls utilization of one or more V2X communication services by the V2X communication device (41, 42, 43), e.g., whether to start utilizing the at least one V2X service and/or whether to stop utilizing another V2X service.

20 Claims, 10 Drawing Sheets

(56) References Cited

U.S. PATENT DOCUMENTS

| | | | |
|---|---|---|---|
| 2018/0124771 A1* | 5/2018 | Mok | H04W 72/51 |
| 2018/0132208 A1* | 5/2018 | Pan | H04W 72/20 |
| 2018/0227882 A1* | 8/2018 | Freda | H04W 8/005 |
| 2018/0332620 A1* | 11/2018 | Malladi | H04W 16/28 |
| 2019/0174482 A1* | 6/2019 | Mok | H04W 36/32 |
| 2019/0239118 A1* | 8/2019 | Baghel | H04W 8/22 |
| 2019/0306912 A1* | 10/2019 | Cheng | H04W 76/27 |
| 2019/0313221 A1* | 10/2019 | Lee | H04W 76/14 |
| 2019/0313222 A1* | 10/2019 | Karampatsis | H04W 4/44 |
| 2019/0313359 A1* | 10/2019 | Lee | H04W 4/40 |
| 2019/0349730 A1* | 11/2019 | Kim | H04W 4/40 |
| 2019/0357025 A1* | 11/2019 | Hwang | H04W 72/02 |
| 2020/0053524 A1* | 2/2020 | Novlan | H04W 84/20 |
| 2020/0059813 A1* | 2/2020 | Park | H04W 4/46 |
| 2020/0092685 A1* | 3/2020 | Fehrenbach | H04W 72/23 |
| 2020/0137536 A1* | 4/2020 | Nguyen | H04L 27/2607 |
| 2020/0178238 A1* | 6/2020 | Mok | H04W 72/51 |
| 2020/0221298 A1* | 7/2020 | Pan | H04W 12/50 |
| 2020/0221423 A1* | 7/2020 | Wang | H04W 72/02 |
| 2020/0288432 A1* | 9/2020 | Min | H04W 4/40 |
| 2020/0296691 A1* | 9/2020 | Lee | H04W 52/383 |
| 2020/0296692 A1* | 9/2020 | Lee | H04W 52/383 |
| 2020/0336871 A1* | 10/2020 | Baek | H04W 8/005 |
| 2020/0367030 A1* | 11/2020 | Baek | H04W 80/02 |
| 2021/0068063 A1* | 3/2021 | Baek | H04W 4/40 |
| 2021/0127362 A1* | 4/2021 | Jin | H04W 72/02 |
| 2021/0195389 A1* | 6/2021 | Novlan | H04W 84/20 |
| 2021/0250908 A1* | 8/2021 | Baek | H04W 72/56 |
| 2021/0258830 A1* | 8/2021 | Baek | H04W 72/569 |
| 2021/0329422 A1* | 10/2021 | Pattan | H04W 4/08 |
| 2021/0344460 A1* | 11/2021 | Park | H04W 72/20 |
| 2021/0345156 A1* | 11/2021 | Baek | H04W 28/0289 |
| 2021/0352465 A1* | 11/2021 | Lee | H04W 4/40 |
| 2021/0410162 A1* | 12/2021 | Kang | H04W 72/23 |
| 2022/0053564 A1* | 2/2022 | Malladi | H04W 16/28 |
| 2022/0264699 A1* | 8/2022 | Wang | H04W 84/20 |
| 2022/0286928 A1* | 9/2022 | Karampatsis | H04W 72/569 |
| 2022/0408226 A1* | 12/2022 | Fehrenbach | H04W 84/005 |
| 2023/0078965 A1* | 3/2023 | Novlan | H04W 12/08 370/329 |
| 2023/0144243 A1* | 5/2023 | Jin | H04W 72/02 370/329 |
| 2024/0098705 A1* | 3/2024 | Selvanesan | H04W 4/08 |
| 2024/0154827 A1* | 5/2024 | Atarius | H04M 15/8016 |

FOREIGN PATENT DOCUMENTS

| | | | |
|---|---|---|---|
| WO | 2018200438 A1 | 11/2018 | |
| WO | 2019004519 A1 | 1/2019 | |
| WO | 2019010049 A1 | 1/2019 | |

OTHER PUBLICATIONS

3rd Generation Partnership Project; Technical Specification Group Services and System Aspect; Study on enhancement of 3GPP Support for 5G V2X Services (Release 16), 3GPP TR 22.886, V16.2.0 (Dec. 2018).

Official Journal of the European Union, "Commision Decision on the harmonised use of radio spectrum in the 5 875-5 905 MHz frequency band for safety-related applications of Intelligent Transport Systems (ITS)", Aug. 5, 2008, pp. 1-3, Brussels, Belgium.

ETSI TC ERM, "Request for information about 63-64 GHZ", ERM(15)055116a1, Liaison Statement, Mar. 26, 2015, pp. 1-6.

Jia, D., et al., "On the Network Connectivity of Platoon-based Vehicular Cyber-Physical Systems", Transportation Research Part C; Emerging Technologies, 40. 215-230, University of Leeds, Sep. 2, 2013, pp. 1-47.

Wikipedia, "Vehicle-to-everything", Retrieved from the internet: URL: https://en.wikipedia.org/wiki/Vehicle-to-everything [retrieved on Dec. 14, 2018], Dec. 10, 2018, pp. 1-8.

European Commission, "A European strategy on Cooperative Intelligent Transport Systems, a milestone towards cooperative, connected and automated mobility", Communication from the Commission to the European Parliament, the Council, the European Economic and Social Committee and the Committee of the Regions, Nov. 30, 2016, pp. 1-18, Brussels, Belgium.

3rd Generation Partnership Project, "Technical Specification Group Services and System Aspects; Study on enhancement of 3GPP Support for 5G V2X Services (Release 15)", 3GPP TR 22.886 v15.3.0, Sep. 1, 2018, pp. 1-58.

Lindberg, P., et al., "Deliverable D2.2 Intermediate Report on V2X Business Models and Spectrum", Fifth Generation Communication Automotive Research and innovation, 5GPP, 5GCAR/D2.2, Jun. 29, 2018, pp. 1-85.

3rd Generation Partnership Project, 3rd Generation Partnership Project; Technical Specification Group Servies and System Aspects; Study on architecture enhancements for EPS and 5G System to support advanced V2X services (Release 16), 3GPP TR 23.786 V1.0.0 (Dec. 2018), Technical Specification, pp. 1-109.

CNOA with Search Report and English machine translation dated Jan. 20, 2025 for Patent Application No. 202210836683.9, consisting of 12 pages.

ETSI TS 103 574 V1.1.1; Technical Specification; Intelligent Transport Systems (ITS); Congestion Control Mechanisms for the C-V2X PC5 interface; Access layer part; Nov. 2018, consisting of 9 pages.

TSG-RAN Working Group 4 (Radio) meeting #78bis R4-161801; Title: Unlicensed band for V2V; Agenda Item: 7.13.1; Source: Ericsson; Document for: Approval; Date and Location: Apr. 11-15, 2016, San Jose del Cabo, Mexico, consisting of 4 pages.

* cited by examiner

810 — TRANSMIT
SERVICE INFORMATION

820 — PARTICIPATE IN SELECTION OF
FORWARDING
V2X COMMUNICATION DEVICE(S)

830 — TRANSMIT
V2X MESSAGE(S)

840 — RECEIVE
V2X MESSAGE(S)

850 — FORWARD
V2X MESSAGE INFORMATION

910 — MODULE 1:
TRANSMITTING OF
SERVICE INFORMATION

920 — MODULE 2:
PARTICIPATING IN SELECTION OF
FORWARDING
V2X COMMUNICATION DEVICE(S)

930 — MODULE 3:
TRANSMITTING OF
V2X MESSAGE(S)

940 — MODULE 4:
RECEIVNG OF
V2X MESSAGE(S)

950 — MODULE 5:
FORWARDNG OF
V2X MESSAGE INFORMATION

V2X COMMUNICATION DEVICE

900

1010 — TRANSMIT
SERVICE INFORMATION

1020 — PARTICIPATE IN SELECTION OF
FORWARDING
V2X COMMUNICATION DEVICE(S)

1110 — MODULE 1:
TRANSMITTING OF
SERVICE INFORMATION

1100

1120 — MODULE 2:
PARTICIPATING IN SELECTION OF
FORWARDING
V2X COMMUNICATION DEVICE(S)

NETWORK NODE

SERVICE INFORMATION FOR V2X SERVICE COORDINATION IN OTHER FREQUENCY SPECTRUM

TECHNICAL FIELD

The present invention relates to methods for controlling vehicle-to-anything (V2X) communication and to corresponding radio devices, systems, and computer programs.

BACKGROUND

V2X communication may be used for providing various kinds of services in relation to vehicles like cars, trucks, busses, trains, ships, aircrafts, motorcycles, bicycles, or the like. V2X communication may for example include: V2V (vehicle-to-vehicle) communication between vehicles; V2P (vehicle-to-pedestrian) communication between a vehicle and a device carried by an individual, e.g., a handheld terminal carried by a pedestrian, cyclist, driver, or passenger; V2I (vehicle-to-infrastructure) communication between a vehicle and a roadside unit (RSU) of traffic infrastructure, e.g., an entity transmitting speed limit notifications, and V2N (vehicle-to-network) communication between a vehicle and a node of the wireless communication network. Typically V2X communication utilizes direct wireless transmissions between V2X communication devices. However, in some cases V2X communication may also utilize network infrastructure or be assisted by network infrastructure. V2X communication may be used to provide various kinds of V2X communication services, also referred to as V2X services.

Basic V2X services include ITS (Intelligent Transport Systems) applications for improving road traffic safety and efficiency, like for example denoted as "day-one ITS services" by the European Commission in the deployment plan of Cooperative-ITS (C-ITS), see the Commission decision of 5 Aug. 2008 on the harmonised use of radio spectrum in the 5 875-5 905 MHz frequency band for safety-related applications of Intelligent Transport Systems (ITS), notified under document number C(2008) 4145, (2008/671/EC). Basic V2X services include hazardous location notifications like: slow or stationary vehicle(s) and traffic ahead warning, Road works warning, weather conditions, emergency brake light, emergency vehicle approaching, other hazards. Further, basic V2X services include signage applications like: in-vehicle signage, in-vehicle speed limits, signal violation and intersection safety, traffic signal priority request by designated vehicles, green light optimal speed advisory, probe vehicle data, shockwave damping.

For basic V2X services, a dedicated ITS spectrum has been allocated in different regions of the world. In most regions, the dedicated ITS spectrum is in the range of 5.850 to 5.925 GHz, also referred to as 5.9 GHz spectrum. In the dedicated 5.9 GHz ITS spectrum, only short-range V2X communication technologies are allowed. Further, the allocated bandwidth in the dedicated 5.9 GHz ITS spectrum quite limited, e.g., only 30 MHz for safety-related basic V2X services in Europe.

Further, various enhanced V2X (eV2X) services have been proposed. eV2X services for example include platooning, advanced driving, extended sensor data sharing, etc. The general purpose of eV2X services is to enable automated drive and even connected autonomous vehicles. A collection of eV2X services can be found in 3GPP TR 22.886 V15.3.0 (2018 September). "On the network connectivity of platoon-based vehicular cyber-physical systems" by J. Jia, K. Lu, and J. Wang, Transportation Research Part C: Emerging Technologies, 40. 215-230, ISSN 0968-090X (2014), describes a platooning service in which a platoon leader is responsible for inter-platoon communication.

As compared to the basic V2X services, eV2X services may require significantly more bandwidth, which limits the possibilities of providing eV2X services in the dedicated ITS band. Further, providing eV2X services in the dedicated ITS band may adversely affect the basic ITS services, e.g., by blocking resources. While V2X radio technologies may also enable using other frequency bands, such as licensed frequency bands for 5G ($5^{th}$ Generation) mobile communication networks or other IMT (International Mobile Telecommunications) services. However, in a given region such licensed frequency bands may be licensed to different mobile network operators (MNOs). This may have the effect that devices associated with different MNOs will not be able to engage in direct eV2X communication in the licensed frequency band.

Accordingly, there is a need for techniques which allow for efficiently providing different V2X services.

SUMMARY

According to an embodiment, a method of controlling V2X communication is provided. According to the method, a V2X communication device receives service information in a first frequency spectrum. The service information indicates availability of at least one V2X communication service in a second frequency spectrum. Based on the received service information, the V2X communication device controls utilization of one or more V2X communication services by the V2X communication device.

According to a further embodiment, a method of controlling V2X communication is provided. According to the method, a V2X communication device transmits service information to one or more further V2X communication devices. The service information indicating availability of at least one V2X communication service in a second frequency spectrum.

According to a further embodiment, a method of controlling V2X communication is provided. According to the method, a node of a wireless communication network transmits service information to one or more V2X communication devices. The service information indicates availability of at least one V2X communication service in a second frequency spectrum.

According to a further embodiment, a V2X communication device is provided. The V2X communication device is configured to receive service information in a first frequency spectrum. The service information indicates availability of at least one V2X communication service in a second frequency spectrum. Further, the V2X communication device is configured to, based on the received service information, control utilization of one or more V2X communication services by the V2X communication device.

According to a further embodiment, a V2X communication device is provided. The V2X communication device comprises at least one processor and a memory. The memory contains instructions executable by said at least one processor, whereby the V2X communication device is operative to receive service information in a first frequency spectrum. The service information indicates availability of at least one V2X communication service in a second frequency spectrum. Further, the memory contains instructions executable by said at least one processor, whereby the V2X communication device is operative, based on the received service information, control utilization of one or more V2X communication services by the V2X communication device.

According to a further embodiment, a V2X communication device is provided. The V2X communication device is configured to transmit, in a first frequency spectrum, service information to one or more further V2X communication devices. The service information indicates availability of at least one V2X communication service in a second frequency spectrum.

According to a further embodiment, a V2X communication device is provided. The V2X communication device comprises at least one processor and a memory. The memory contains instructions executable by said at least one processor, whereby the V2X communication device is operative to transmit, in a first frequency spectrum, service information to one or more further V2X communication devices. The service information indicates availability of at least one V2X communication service in a second frequency spectrum.

According to a further embodiment, a node for a wireless communication network is provided. The node is configured to transmit, in a first frequency spectrum, service information to one or more V2X communication devices. The service information indicates availability of at least one V2X communication service in a second frequency spectrum.

According to a further embodiment, a node for a wireless communication network is provided. The node comprises at least one processor and a memory. The memory contains instructions executable by said at least one processor, whereby the node is operative to transmit, in a first frequency spectrum, service information to one or more V2X communication devices. The service information indicates availability of at least one V2X communication service in a second frequency spectrum.

According to a further embodiment of the invention, a computer program or computer program product is provided, e.g., in the form of a non-transitory storage medium, which comprises program code to be executed by at least one processor of a V2X communication device. Execution of the program code causes the V2X communication device to receive service information in a first frequency spectrum. The service information indicates availability of at least one V2X communication service in a second frequency spectrum. Further, execution of the program code causes the V2X communication device to, based on the received service information, control utilization of one or more V2X communication services by the V2X communication device.

According to a further embodiment of the invention, a computer program or computer program product is provided, e.g., in the form of a non-transitory storage medium, which comprises program code to be executed by at least one processor of a V2X communication device. Execution of the program code causes the V2X communication device to transmit, in a first frequency spectrum, service information to one or more further V2X communication devices. The service information indicates availability of at least one V2X communication service in a second frequency spectrum.

According to a further embodiment of the invention, a computer program or computer program product is provided, e.g., in the form of a non-transitory storage medium, which comprises program code to be executed by at least one processor of a node for a wireless communication network. Execution of the program code causes the node to transmit, in a first frequency spectrum, service information to one or more further V2X communication devices. The service information indicates availability of at least one V2X communication service in a second frequency spectrum.

Details of such embodiments and further embodiments will be apparent from the following detailed description of embodiments.

DETAILED DESCRIPTION OF EMBODIMENTS

Figure 1:
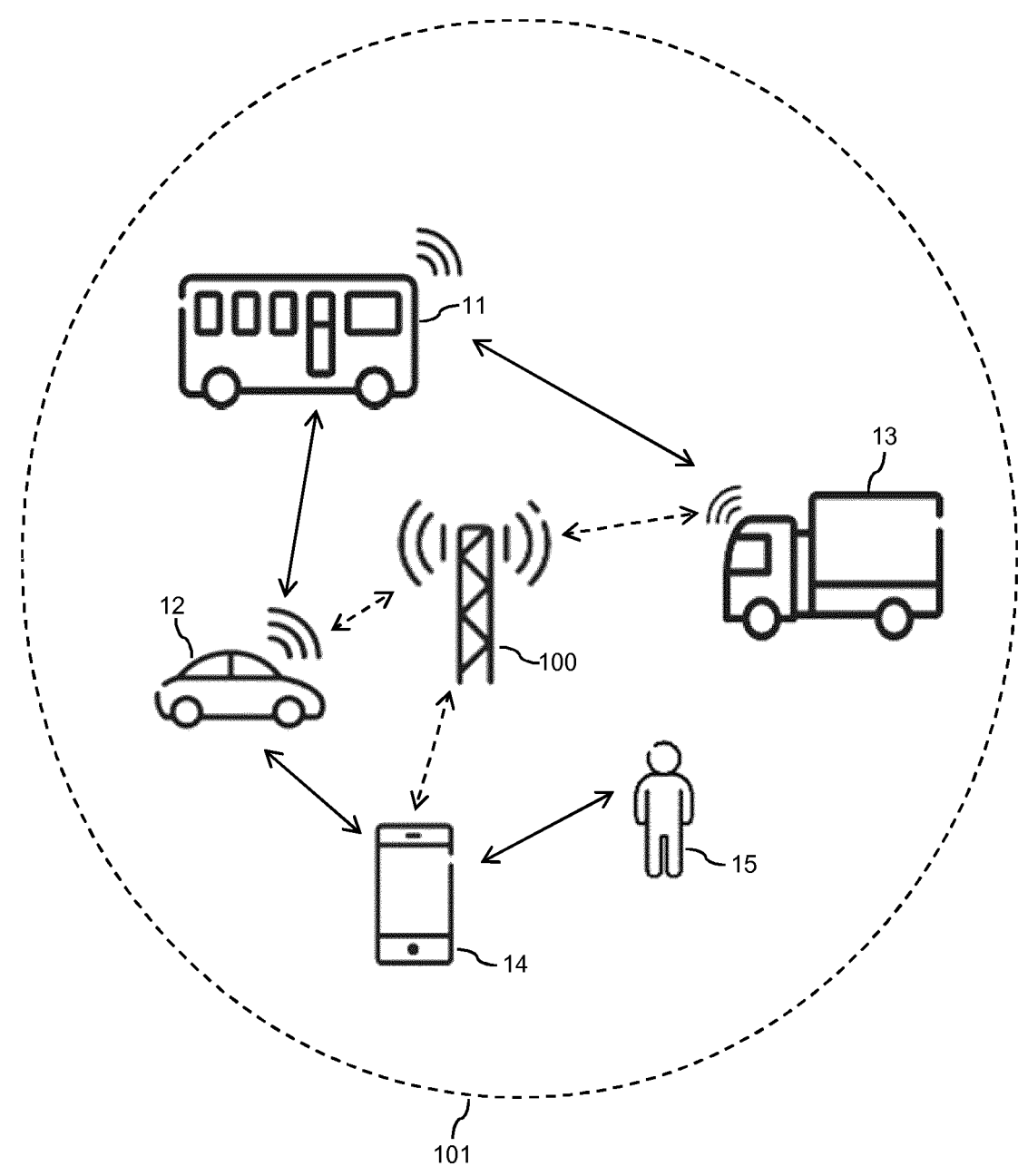
FIG. 1 shows an exemplary scenario for illustrating V2X communications according to an embodiment of the invention.

In the following, concepts in accordance with exemplary embodiments of the invention will be explained in more detail and with reference to the accompanying drawings. The illustrated embodiments relate to controlling of V2X communication, and in particular to efficiently providing various V2X services, for example including both basic V2X services and eV2X services, in a coordinated manner, using service information transmitted in the first frequency spectrum to enable V2X communication devices to decide whether to utilize the first V2X service(s) and/or the second V2X service(s).

In the illustrated examples, one or more first V2X services are provided in a first frequency spectrum while one or more second V2X services are provided in a second frequency spectrum which is different from the first frequency spectrum. Further, in the first frequency spectrum the first V2X service(s) may be based on a first radio technology, and in the second frequency spectrum the second V2X service(s) may be based on a second radio technology. By way of example, the first V2X services may include basic V2X services aiming at improving traffic safety and efficiency. The second V2X service(s) may in turn include eV2X services aiming at enabling automated driving functionalities, including autonomous driving. One example of eV2X services is platooning, which involves coordination of vehicle movements in a group of vehicles, so that the vehicles move in a well-defined formation. Another example of eV2X services is real-time sharing of vehicle sensor data by vehicles, including data provided by vehicle-based cameras, accelerometers, velocimeters, or distance sensors. In the illustrated examples, the first V2X service(s) may be based on a short-range V2X radio technology like the LTE (Long Term Evolution) PC5 interface specified by 3GPP (3$^{rd}$ Generation Partnership Project). The second V2X service(s) may in turn be based on another short-range V2X radio technology like the NR (New Radio) PC5 interface specified by 3GPP. The first V2X service(s) may be provided in a dedicated ITS band, e.g., in the 5.9 GHz ITS band. The second V2X service(s) may be provided in one or more other frequency bands, for example in one or more licensed frequency bands. However, it is noted that other combinations of radio technologies or frequency spectra could be used as well. For example, in some scenarios the first frequency spectrum could also include a licensed frequency band assigned to a cellular network, and the service information could be transmitted by the cellular network, in addition or as an alternative to transmitting the service information in the first V2X service. Further, the first radio technology or second radio technology could for example also utilize a cellular downlink (DL)/uplink (UL) radio interface like the Uu interface of specified by 3GPP, e.g., the UMTS (Universal Mobile Telecommunications System) Uu interface, the LTE Uu interface, the 5G NR Uu interface, or an ad-hoc radio technology like the ITS-G5 technology, the IEEE 802.11p/DSRC (Dedicated Short-Range Communication) technology, or the IEEE 802.11bd/NGV (Next Generation V2X) technology.

FIG. 1 illustrates an exemplary scenario involving V2X communications. In particular, FIG. 1 shows various entities 11, 12, 13, 14, 15 which may engage in V2X communication, illustrated by solid arrows. Further, FIG. 1 shows an access node 100 of a wireless communication network, e.g., an eNB of the LTE technology or a gNB of the NR technology, or an access point of a WLAN (Wireless Local Area Network). At least some of the entities 11, 12, 13, 14, 15 may also be capable of communicating by using DL radio transmissions and/or UL radio transmissions, illustrated by broken arrows. A service area, or cell, of the access node is schematically illustrated by 101. The service area 101 may be defined by a radio coverage area in which DL radio transmissions from the access node 100 and UL radio transmissions to the access node 100 are possible. Here, it is noted that the wireless communication network may comprise further access nodes, each having a corresponding service area which may be overlapping or non-overlapping with the coverage area 101 of the access node 100.

The entities illustrated in FIG. 1 comprise vehicles 11, 12, 13, a mobile phone 14, and a person 15, e.g., a pedestrian, a cyclist, a driver of a vehicle, or a passenger of a vehicle. Here, it is noted that in the case of the vehicles 11, 12, 13 the radio transmissions may be performed by a communication module installed in the vehicle, and that in the case of the person 15 the radio transmissions may be performed by a radio device carried or worn by the person 15, e.g., a wristband device or similar wearable device. These devices and modules may be also referred as UEs. Furthermore, it is noted that the entities shown in FIG. 1 are merely exemplary and that in the illustrated concepts other types of V2X communication device could be utilized as well, e.g., RSUs or other infrastructure based V2X communication devices, V2X communication devices based in an aircraft, like an airplane, helicopter, drone, in a spacecraft, in a train or car of a train, in a ship, in a motorcycles, in a bicycle, in a mobility scooter, or in any other kind of mobility or transportation device.

Figure 2:
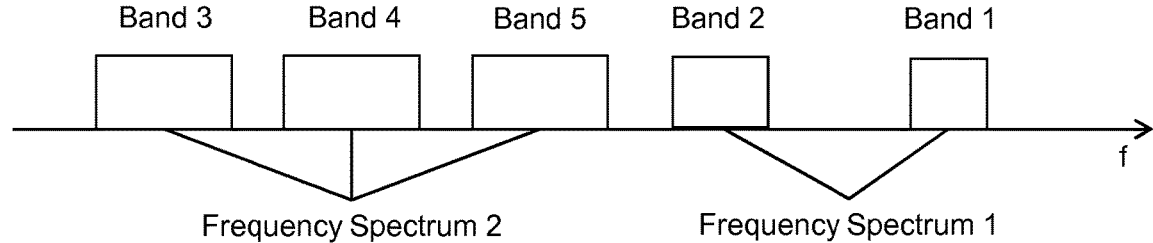
FIG. 2 illustrates an example of frequency spectra which may be utilized for V2X services.

FIG. 2 schematically illustrates frequency spectra which may be utilized in the illustrated concepts. In particular, FIG. 2 illustrates an example of the above-mentioned first frequency spectrum (denoted as frequency spectrum 1) and second frequency spectrum (denoted as frequency spectrum 2). In the illustrated example, the first frequency spectrum includes a first frequency band (band 1) and a second frequency band (band 2). In the illustrated example, the first frequency band and the second frequency band are non-adjacent. However, it is noted that in other examples the first frequency band and the second frequency band could also be adjacent. Further, in the illustrated example the second frequency spectrum includes a third frequency band (band 3), a fourth frequency band (band 4), and a fifth frequency band (band 5). In the illustrated example, the third frequency band, the fourth frequency band, and the fifth frequency band are non-adjacent. However, it is noted that in other examples at least some of the third frequency band, the fourth frequency band, and the fifth frequency band could also be adjacent. Accordingly, the first frequency spectrum and the second frequency spectrum may be continuous or discontinuous. Further, it is noted that the first frequency spectrum and the second frequency spectrum could be non-overlapping like illustrated in FIG. 2, but that also overlapping configurations are possible, e.g., with one of the frequency bands of the first frequency spectrum being arranged between two of the frequency bands of the second frequency spectrum. Further, it is noted that the number of the frequency bands illustrated in FIG. 2 is merely exemplary and that that the first frequency spectrum and the second frequency spectrum could each include less frequency bands or more frequency bands. For example, the first frequency spectrum could include only the first frequency band and the second frequency spectrum could include only the third frequency band.

In the following explanations, it is assumed that the first frequency band is a dedicated ITS band assigned by regional or international regulation, e.g., the ITS band between 5.855 GHz and 5.925 GHZ as for example specified in Europe or the ITS band between 5.850 GHz and 5.925 GHz as for example specified in the USA. The second frequency band, third frequency band, fourth frequency band, and fifth frequency band may each be licensed frequency bands which are assigned to the same MNO or to different MNOs, e.g., 5G frequency bands and/or IMT frequency bands. Here, the frequency band being licensed means that utilization of the frequency band is typically only allowed for devices operated by the MNO to which the frequency band is assigned or for devices of users having a subscription with the MNO to which the frequency band is assigned.

In the example as further detailed below, the first frequency band is assumed to be utilized for providing basic V2X services. The third frequency band, the fourth frequency band, and/or the fifth frequency band are in turn utilized for providing various eV2X services. In particular, the third frequency band may be utilized for providing a first eV2X service, the fourth frequency band may be utilized for providing a second eV2X service, and the fifth frequency band may be utilized for providing a third eV2X service. However, it would also be possible to utilize two or more of the third frequency band, fourth frequency band, and fifth frequency band to provide the same eV2X service, and/or to utilize the same frequency band to provide two or more of the first eV2X service, the second eV2X service, and the third eV2X service.

The first eV2X service, the second eV2X service, and the third eV2X service may differ with respect to the type of eV2X service, with respect to the utilized radio technology, with respect to a geographical area in which the eV2X service is available, or with respect to requirements and conditions of using the eV2X service, such as radio technology requirements, communication protocol requirements, subscription requirements, charging requirements, or the like. Still further, the first eV2X service, the second eV2X service, and the third eV2X service may also differ with respect to usage status, e.g., in terms of number of active users or occupancy level, and such usage status may vary depending on time and/or depending on geographical location.

In accordance with the illustrated concepts, the first frequency band may be utilized for transmitting service information. The service information indicates the availability of the eV2X services in the second frequency spectrum. This may also be referred to as advertising the eV2X services in the second frequency spectrum. In particular, the service information may indicate the availability of the first eV2X service in the third frequency band, the availability of the second eV2X service in the fourth frequency band, and/or the availability of the third eV2X service in the fifth frequency band. This may be accomplished in one or more messages of a V2X service in the first frequency band. In some scenarios, a single message of the V2X service in the first frequency band may be used to indicate the availability of multiple eV2X services in the second frequency spectrum, e.g., the availability of the first eV2X service in the third frequency band, e.g., the availability of at least two the second eV2X service in the fourth frequency band, and the availability of the third eV2X service in the fifth frequency band. In other scenarios, a separate message of the V2X service in the first frequency band may be used for each of multiple eV2X services in the second frequency spectrum to indicate its availability.

In addition or as an alternative to transmitting the service information in the first frequency band, at least a part of the service information could also be transmitted in the second frequency band. In the second frequency band, the service information could be transmitted via a cellular radio technology, e.g., the UMTS, LTE, or NR cellular radio technology. In this way, it may become possible to indicate the availability of the eV2X services in the second frequency spectrum in a wider area covered by the cellular radio technology.

The service information may indicate the type of the eV2X service, e.g. platooning, vehicle sensor sharing, or the like. In addition or as an alternative, the service information may indicate frequency information, e.g., one or more frequency bands, one or more frequency subbands within a frequency band, and/or one or more specific frequencies utilized for providing the eV2X service. In addition or as an alternative, the service information may indicate geographic information to indicate one or more geographic areas in which the eV2X service is available. In addition or as an alternative, the service information may indicate requirements and/or conditions for using the eV2X service, e.g., technology requirements like radio technology, communication protocol, or the like, charging information, etc. In addition or as an alternative, the service information may indicate information on current usage status of the eV2X service, e.g., a number of active users of the eV2X service, an occupancy level of the eV2X service, or the like. The usage status may be indicated for a certain location, e.g., for the location where the service information is receivable by a V2X communication device.

Figure 3A:
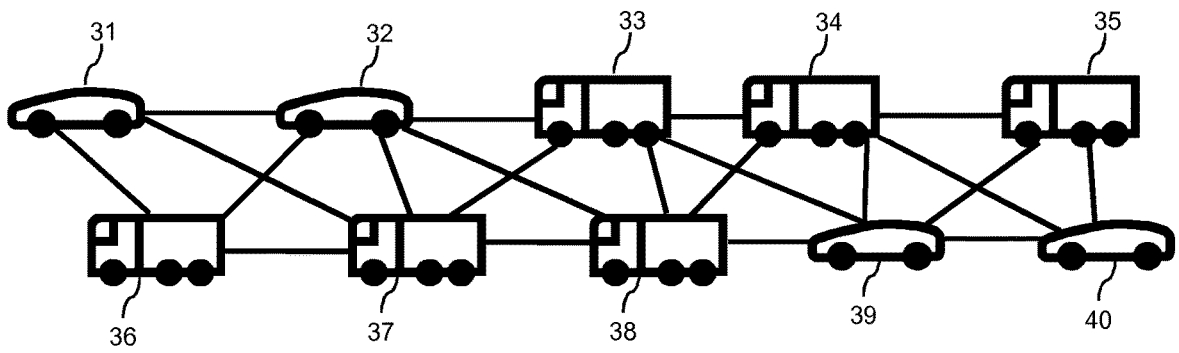
FIGS. 3A, 3B, and 3C illustrates an example of coordinating basic V2X services and eV2X services according to an embodiment of the invention.
Figure 3B:
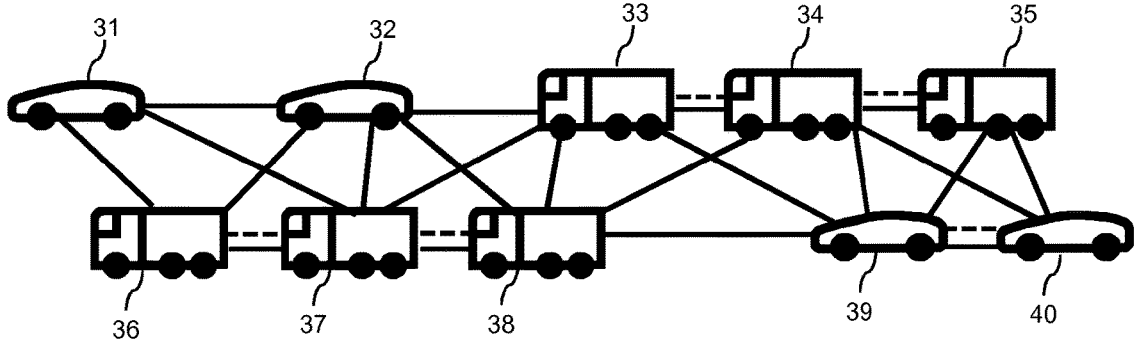
Figure 3C:
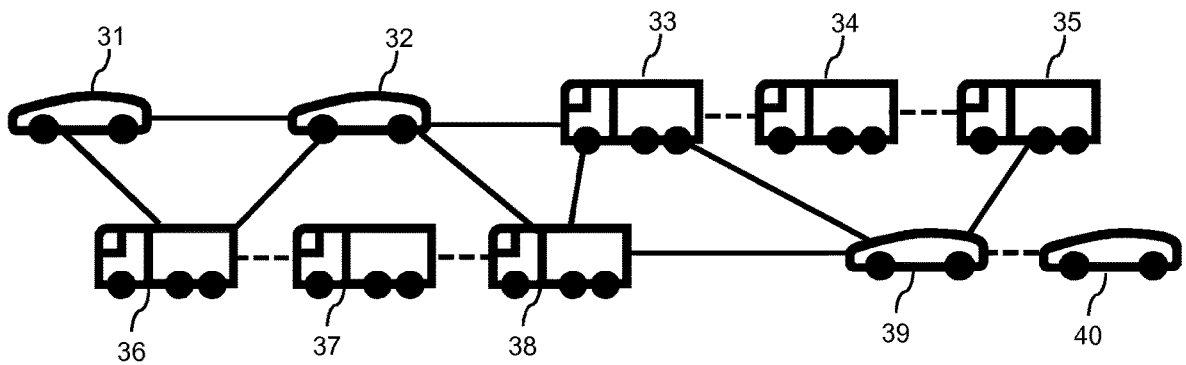

FIGS. 3A, 3B, and 3C illustrate an example of how the illustrated concepts may be utilized to coordinate the utilization of the V2X services in the first frequency spectrum and the utilization of the eV2X services in the second frequency spectrum.

FIG. 3A illustrates an initial scenario in which multiple vehicles 31, 32, 33, 34, 35, 36, 37, 38, 39, 40, i.e., multiple V2X communication devices, are in engaged in V2X communication. In the scenario of FIG. 3A, the vehicles 31, 32, 33, 34, 35, 36, 37, 38, 39, 40 all utilize one or more of the V2X services in the first frequency band. As mentioned above, one or more messages of the V2X services in the first frequency band may be used to transmit the service information indicating the availability of the eV2X services in the third frequency band, the fourth frequency band, and the fourth frequency band. At least a part of the service information could be provided via cellular radio communication in the second frequency band. Further, at least a part of the service information could be provided by one or more RSUs in one or more messages of the V2X services in the first frequency band. Further, one or more of the vehicles 31, 32, 33, 34, 35, 36, 37, 38, 39, 40 could receive the at least a part of the service information via cellular radio communication or from one or more RSUs and then forward the service information in one or more messages of the V2X services in the first frequency band to other vehicles.

Based on the received service information the vehicles 31, 32, 33, 34, 35, 36, 37, 38, 39, 40 can then decide whether to utilize one or more of the eV2X services in the second frequency spectrum and whether to continue utilizing the V2X services in the first frequency spectrum. For each vehicle 31, 32, 33, 34, 35, 36, 37, 38, 39, 40, the decision can be based on technical capability of the vehicle 31, 32, 33, 34, 35, 36, 37, 38, 39, 40, e.g., supported radio technology or communication protocols supported by the vehicle 31, 32, 33, 34, 35, 36, 37, 38, 39, 40. For example, if the technical capability of the vehicle 31, 32, 33, 34, 35, 36, 37, 38, 39, 40 matches a technology requirement indicated by the service information for a certain eV2X service, the vehicle 31, 32, 33, 34, 35, 36, 37, 38, 39, 40 may decide to utilize this eV2X service. Further, the decision can be based on the frequency band in which the eV2X service is provided. For example, if V2X communication in the frequency band indicated by the service information for a certain eV2X service is supported by the vehicle 31, 32, 33, 34, 35, 36, 37, 38, 39, 40, the vehicle 31, 32, 33, 34, 35, 36, 37, 38, 39, 40 may decide to utilize this eV2X service. Further, the decision can be based on the geographic area where the vehicle 31, 32, 33, 34, 35, 36, 37, 38, 39, 40 is currently located or which is expected to be travelled by the vehicle 31, 32, 33, 34, 35, 36, 37, 38, 39, 40. For example, if this geographical area matches the geographical area for which availability of a certain eV2X service is indicated by the service information, the vehicle 31, 32, 33, 34, 35, 36, 37, 38, 39, 40 may decide to utilize this eV2X service. Further, the decision may be based on the usage status of a certain eV2X service indicated by the service information. For example, if the service information indicates that the number of users for a certain eV2X service is above a threshold, the vehicle 31, 32, 33, 34, 35, 36, 37, 38, 39, 40 may decide to utilize this eV2X service. In this way, it may for example be possible to utilize a platooning service only if the group of vehicles participating in the platooning service has a certain minimum size. According to a further example, if the service information indicates that the occupancy level for a certain eV2X service is below a threshold, the vehicle 31, 32, 33, 34, 35, 36, 37, 38, 39, 40 may decide to utilize this eV2X service. In this way, it may for example be possible to avoid participating in an eV2X service which is already close to maximum occupancy. Further, the decision whether to utilize a certain eV2X service may be based on whether charging conditions indicated by the service information are acceptable. In this way, it may for example be possible to avoid participating in an eV2X service which is excessively expensive. Still further, the decision whether to utilize a certain eV2X service may be based on or on various user preferences. Based on the same or similar criteria, the vehicles 31, 32, 33, 34, 35, 36, 37, 38, 39, 40 may also decide to stop utilizing a certain eV2X service.

In the example of FIG. 3B, it is assumed that the vehicles 33, 34, and 35 decide to utilize the first eV2X service, e.g., a first platooning service for trucks. The corresponding V2X communication in the third frequency band is indicated by a broken line between the vehicle 33 and the vehicle 34, and by a broken line between the vehicle 34 and the vehicle 35. Further, it is assumed that the vehicles 36, 37, and 38 decide to utilize the second eV2X service, e.g., a second platooning service for trucks. The corresponding V2X communication in the fourth frequency band is indicated by a broken line between the vehicle 36 and the vehicle 37, and by a broken line between the vehicle 37 and the vehicle 38. Further, it is assumed that the vehicles 39 and 40 decide to utilize the third eV2X service, e.g., a platooning service for passenger cars. The corresponding V2X communication in the fifth frequency band is indicated by a broken line between the vehicle 39 and the vehicle 40. Further, it is assumed that vehicles 31, 32 decide not to utilize any of the eV2X services indicated by the service information.

As illustrated by the solid lines in FIG. 3B, irrespective of utilizing the eV2X service the vehicles 31, 32, 33, 34, 35, 36, 37, 38, 39, 40 may continue to utilize the V2X services in the first frequency band. Accordingly, at least some of the vehicles 31, 32, 33, 34, 35, 36, 37, 38, 39, 40 may support multiple V2X technologies, e.g., LTE-V2X PC5 and NR V2X PC5, and simultaneous utilization of V2X communication in different frequency bands.

In many cases, an eV2X service can provide the same or even higher level of safety-related functions than a basic V2X service. In view of this situation, the vehicles 31, 32, 33, 34, 35, 36, 37, 38, 39, 40 may also decide whether to continue utilization of the V2X services in the first frequency band while also utilizing one of the eV2X services, thereby achieving a more efficient usage of radio resources in the first frequency band. In order to enable discontinuing utilization of the V2X services in the first frequency band without adversely affecting safety-related functions, the illustrated concepts may also involve that in a group of the vehicles utilizing a certain eV2X service one or more delegates are selected that continue utilizing the V2X services in the first frequency band, while other vehicles of the group stop utilizing the V2X services in the first frequency band. FIG. 3C illustrates a corresponding scenario.

The scenario of FIG. 3C assumes that, starting from the situation explained in connection with FIG. 3B, in the group of the vehicles 33, 34, 35 utilizing the first eV2X service the vehicles 33 and 35 were selected as delegates, that in the group of the vehicles utilizing the second eV2X service the vehicles 36 and 38 were selected as delegates, and that in the group of the vehicles utilizing the third eV2X service the vehicles 39 was selected as delegate. Accordingly, in the scenario of FIG. 3C only the vehicles 31, 32, 33, 34, 35, 36, 38, and 39 continue utilizing the V2X services in the first frequency band, while the vehicles 34, 37, and 40 have stopped utilizing the V2X services in the first frequency band. In this way, efficiency of radio resource usage in the first frequency band can be improved, while still enabling safety related V2X functionality also between the vehicles 33, 34, 35, 36, 37, 38, 39, 40 utilizing different eV2X services, e.g., between the vehicles 33, 34, 35 utilizing the first eV2X service and the vehicles 36, 37, 38 utilizing the second eV2X service, and also between the vehicles 33, 34, 35, 36, 37, 38, 39, 40 utilizing one of the eV2X services and the vehicles 31, 32 utilizing the V2X services in the first frequency band, but none of the eV2X service.

The selection of the vehicles 33, 34, 35, 36, 38, and 39 as delegates may be based on relative positions of the vehicles 33, 34, 35, 36, 38, and 39 within the group and/or in relation to other vehicles 31, 32, 33, 34, 35, 36, 38, 39, 40 another one of the eV2X services or the V2X services. The selection can be performed in a distributed manner, e.g., based on negotiation between vehicles 33, 34, 35, 36, 37, 38, 39, 40 of the group. Further, at least a part of the selection can also be performed in a centralized manner, e.g., by a network node like the above-mentioned access node 100, or by a specific vehicle 33, 34, 35, 36, 37, 38, 39, 40 within the group. For example, the selection could be performed by a vehicle 33, 34, 35, 36, 37, 38, 39, 40 designated as platoon leader or cluster leader. The selection may be performed in response to a vehicle 31, 32, 33, 34, 35, 36, 37, 38, 39, 40 joining the group, in response to a vehicle 31, 32, 33, 34, 35, 36, 37, 38, 39, 40 leaving the group, and/or in response to a change of conditions, such as a change of vehicle status, e.g., vehicle speed or vehicle acceleration, a change of road conditions, e.g., a change of road curvature or road surface, a change of environmental conditions, e.g., a change of weather, or the like.

Figure 4:
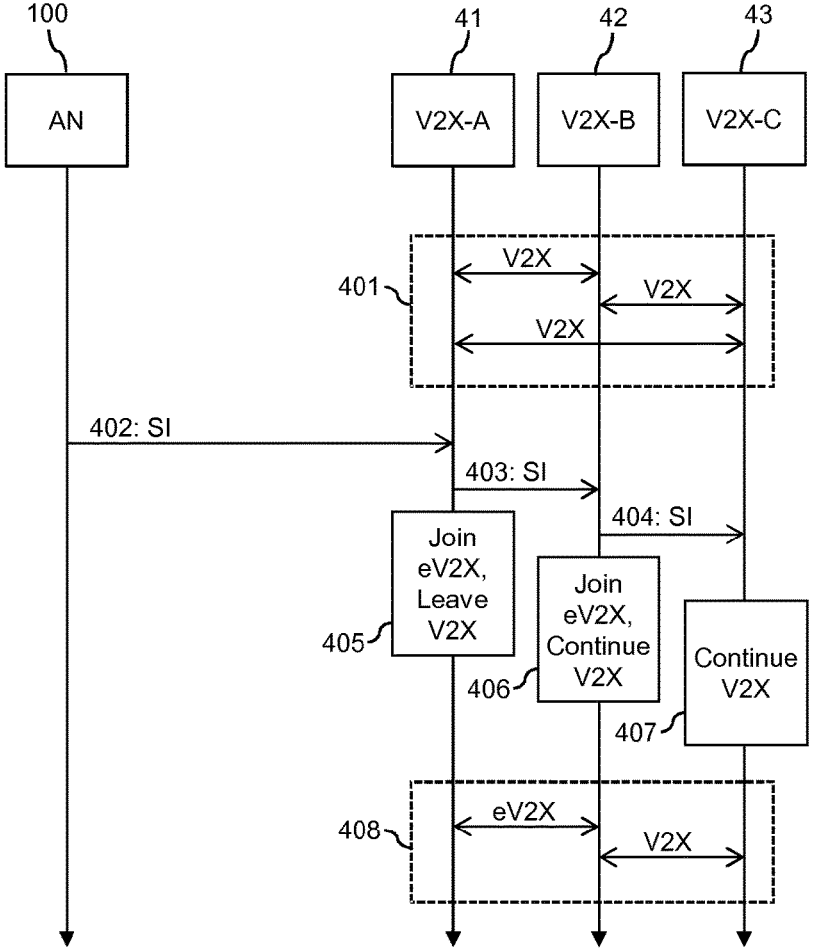
FIG. 4 illustrates exemplary processes according to an embodiment of the invention.

FIG. 4 shows an example of processes in which V2X communication is controlled based on the principles as outlined above. The processes of FIG. 4 involve the access node (AN) 100 and V2X communication devices 41, 42, 43, denoted as "V2X-A", "V2X-B", and "V2X-C". The V2X communication devices 41, 42, 43 may correspond to any of the above-mentioned entities 11, 12, 13, 14, 15 or to any of the above-mentioned vehicles 31, 32, 33, 34, 35, 36, 37, 38, 39, 40. Further, it is noted that the number of the V2X communication devices 41, 42, 43 in the example of FIG. 4 is merely exemplary, and that in typical practical scenarios the number of the V2X communication devices 41, 42, 43 engaged in the V2X communication or eV2X communication may be significantly larger.

In the exemplary processes of FIG. 4, it is assumed that initially the V2X communication devices 41, 42, 43 initially utilize the V2X services in the first frequency band, as illustrated by double-headed arrows in box 401. As illustrated, this may involve that all the V2X communication devices 41, 42, 43 are engaged in direct V2X communication with each other.

As further illustrated, at some point the access node 100 transmits service information 402. This may for example be accomplished in a broadcast message of a cellular radio technology supported by the access node 100. The service information 402 may indicate availability of at least one eV2X service in the second frequency spectrum, e.g., availability of the above-mentioned first eV2X service, second eV2X service, or third eV2X service. In addition to merely indicating the availability, the service information 402 may include additional information as mentioned above.

In the example of FIG. 4, the V2X communication device 41 receives the service information 402 and forwards at least a part of the received service information 402, as indicated by service information 403. Similarly, the V2X communication device 42 receives the service information 402 and forwards at least a part of the received service information 402, as indicated by service information 404, which in the illustrated example is received by the V2X communication device 43. In this way, the service information 402, 403, 404 may be propagated to the different V2X communication devices 41, 42, 43, even if some of the V2X communication devices are not within coverage of the access node 100 or not within coverage of V2X communication of one or more of the other V2X communication devices 41, 42, 43.

Based on the received service information 402, 403, 404 the V2 X communication devices 41, 42, 43 then decide whether to utilize the eV2X service indicated by the service information 402, 403, 404 and whether to continue utilizing the V2X services in the first frequency band. As indicated by blocks 405, 406, and 407, the V2X communication device 41 decides to join the eV2X service and leave the V2X services, the V2X communication device 42 decides to join the eV2X service and to continue utilizing the V2X services, and the V2X communication device 43 decides to not join the eV2X service and to continue utilizing the V2X services. This may for example involve a selection of the V2X communication device 42 as delegate like explained in connection with FIG. 3C.

As illustrated by double-headed arrows in box 408, the V2X communication devices 41 and 42 may then utilize the eV2X service, while the V2X communication devices continue utilizing the V2X services. The V2X communication device 42 may forward certain messages of the eV2X service, in particular safety-related messages, or information from certain messages of the eV2X service, in particular safety-related information, in one or more messages of the V2X services to the V2X communication device 43. Similarly, the V2X communication device 42 may forward certain messages of the V2X service, in particular safety-related messages, or information from certain messages of the V2X service, in particular safety-related information, in one or more messages of the eV2X service to the V2X communication device 41.

Figure 5:
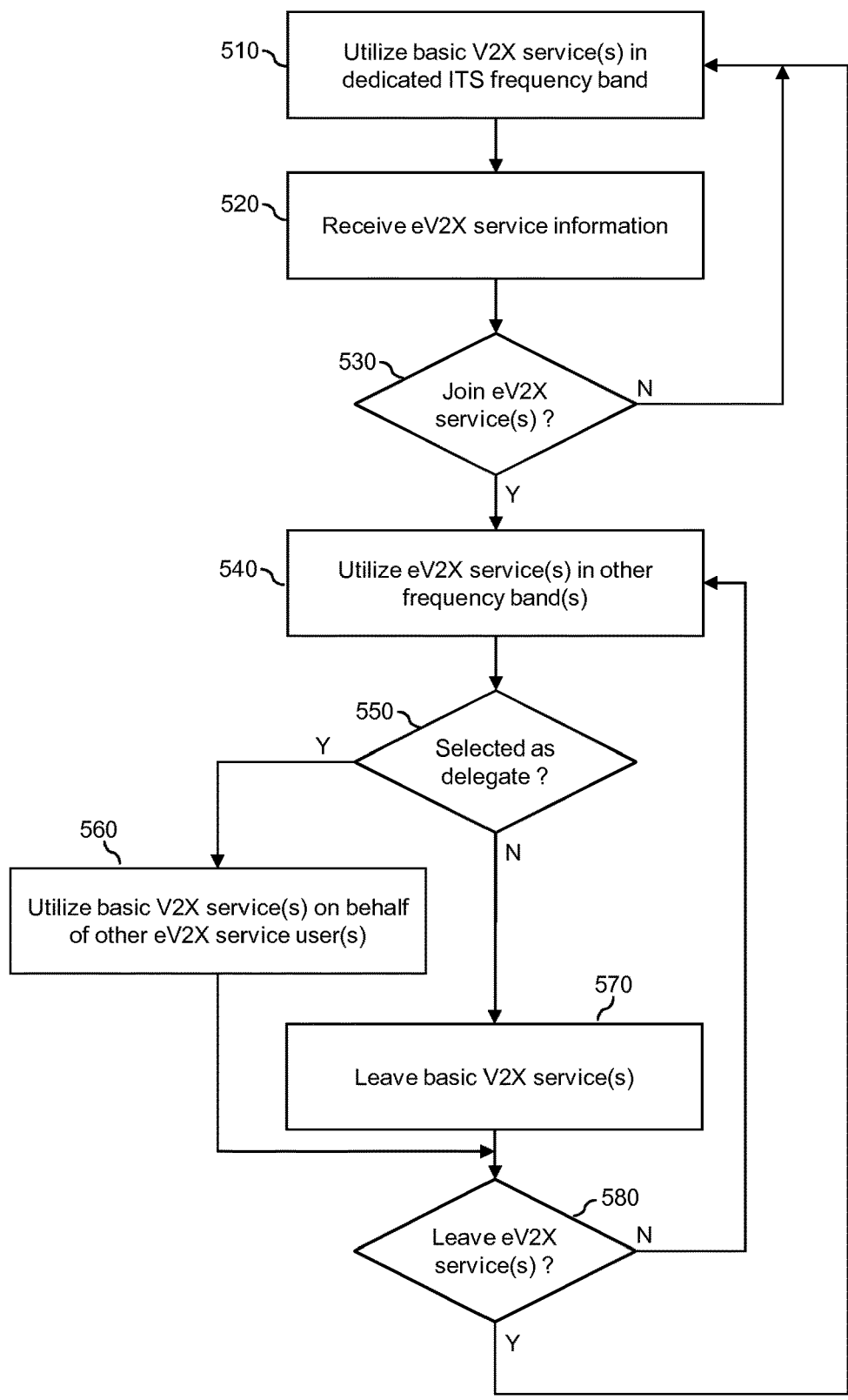
FIG. 5 shows a flowchart for illustrating an exemplary procedure of coordinating utilization of V2X services and eV2X services according to an embodiment of the invention.

FIG. 5 shows a flowchart for illustrating a procedure according to which V2X communication device, e.g., any of the above-mentioned entities 11, 12, 13, 14, 15 or vehicles 31, 32, 33, 34, 35, 36, 37, 38, 39, 40, may operate when implementing the illustrated concepts. The exemplary procedure assumes that one or more basic V2X services are provided in a dedicated ITS frequency band, e.g., corresponding to the above-mentioned first frequency band, and that one or more eV2X services are provided in one or more other frequency bands, e.g., corresponding to one or more of the above-mentioned third, fourth, and fifth frequency bands.

At step 510, the 2X communication device utilizes the basic V2X service(s) in the dedicated ITS frequency band. This may also involve that the V2X communication device receives, transmits, or forwards service information indicating availability of one or more eV2X services, in FIG. 5 denoted as eV2X service information. At step 520, the V2X communication device receives certain eV2X service information, which is used as a basis for deciding at step 530 whether the V2X communication device should join the eV2X service(s) indicated by the eV2X service information. If the V2X communication device decides not to join the eV2X service(s), the procedure returns to step 510, as indicated by branch "N". If the V2X communication device decides to not join the eV2X service(s), the V2X communication device utilizes the eV2X service(s), as indicated by step 540.

At step 550, the V2X communication device may check whether it was selected as a delegate for forwarding of messages or information between the basic V2X service(s) and the eV2X service(s). If this is the case, the V2X communication device further utilizes the basic V2X service(s) on behalf of one or more other users of the eV2X service(s), as indicated by branch "Y" and step 560. If the V2X communication device was not selected as delegate, the V2X communication device may leave the V2X service(s), as indicated by step 570. After step 560 or 570 the procedure may continue with block 580, where the V2X communication device decides whether to leave the eV2X service(s), e.g., based on updated service information received by the V2X communication device and/or based on a detected change of conditions. If the V2X communication device decides to leave the eV2X service(s), the procedure returns to step 510, as indicated by branch "Y". If the V2X communication device decides not to leave the eV2X service(s), the procedure returns to step 540, as indicated by branch "N".

Figure 6:
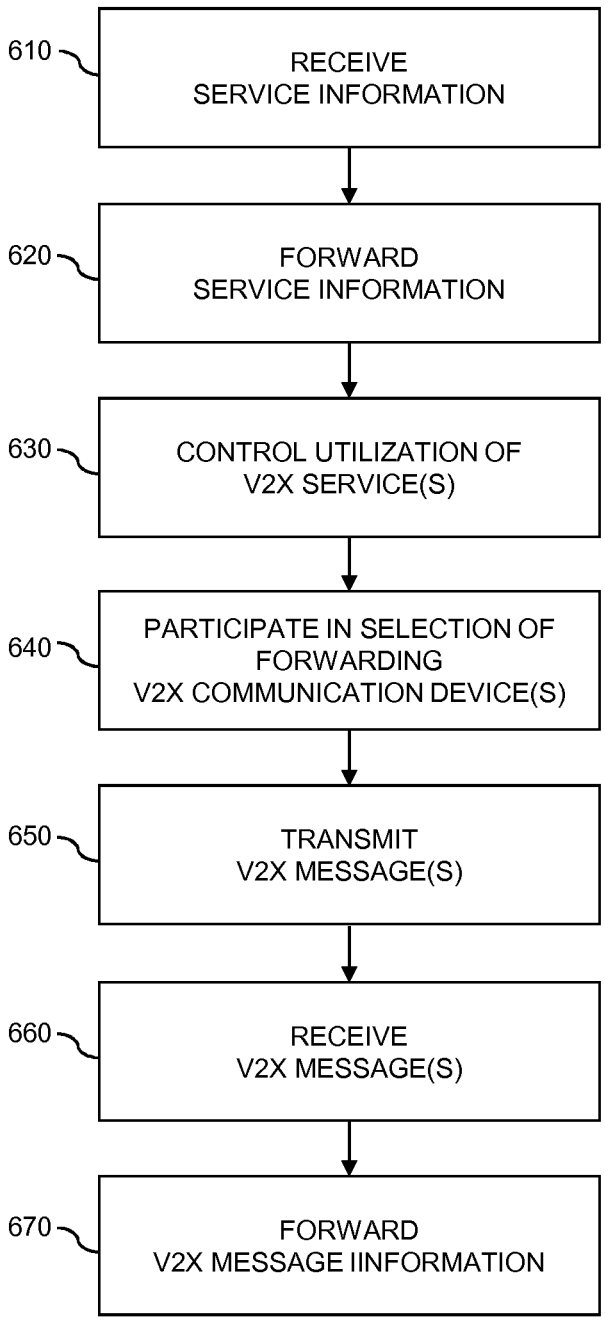
FIG. 6 shows a flowchart for illustrating a method according to an embodiment of the invention.

FIG. 6 shows a flowchart for illustrating a method of controlling V2X communication, which may be utilized for implementing the illustrated concepts. The method of FIG. 6 may be used for implementing the illustrated concepts in a V2X communication device, e.g., corresponding to any of the above-mentioned entities 11, 12, 13, 14, 15 or to any of the above-mentioned vehicles 31, 32, 33, 34, 35, 36, 37, 38, 39, 40.

If a processor-based implementation of the V2X communication device is used, at least some of the steps of the method of FIG. 6 may be performed and/or controlled by one or more processors of the V2X communication device. Such V2X communication device may also include a memory storing program code for implementing at least some of the below described functionalities or steps of the method of FIG. 6.

At step 610, the V2X communication device receives service information in a first frequency spectrum. The service information indicates availability of at least one V2X communication service in a second frequency spectrum. The first frequency spectrum may include a dedicated ITS frequency band, e.g., like for example explained for the first frequency band of FIG. 2. In addition, the first frequency spectrum may include at least one licensed frequency band e.g., like for example explained for the second frequency band of FIG. 2. The second frequency spectrum may include at least one licensed frequency band, e.g., like for example explained for the third, fourth, and fifth frequency band of FIG. 2.

The service information may indicate a type of the at least one V2X communication service in the second frequency spectrum. In addition or as an alternative, the service information may indicate one or more frequencies utilized for the at least one V2X communication service in the second frequency spectrum, e.g., in terms of one or more frequency bands, one or more frequency subbands, and/or one or more individual frequencies. In addition or as an alternative, the service information may indicate indicates a geographic area in which the at least one V2X communication service in the second frequency spectrum is available. In addition or as an alternative, the service information may indicate usage requirements for the at least one V2X communication service in the second frequency spectrum, e.g., a requirement related to charging conditions, a requirement related to a radio technology utilized for the at least one V2X communication service in the second frequency spectrum, or a requirement related to a communication protocol utilized for the at least one V2X communication service in the second frequency spectrum. In addition or as an alternative, the service information may indicate a usage status of the at least one V2X communication service in the second frequency spectrum, e.g., in terms of a number of users and/or in terms of an occupancy level.

The at least one V2X communication service in the second frequency spectrum may enable coordination of movements by vehicles of a group. For example, the at least one V2X communication service in the second frequency spectrum may correspond to a platooning service. In addition or as an alternative, the at least one V2X communication service in the second frequency spectrum may enable sharing of sensor data by vehicles of a group, e.g., for supporting automated driving functionalities.

The V2X communication device may receive the service information based on a first radio technology, and the at least one V2X communication service in the second frequency spectrum may be based on a second radio technology which is different from the first radio technology. For example, the V2X communication device may receive at least a part of the service information based on the LTE PC5 V2X interface or based on an ad-hoc radio technology like the ITS-G5 technology, the IEEE 802.11p/DSRC, or the IEEE 802.11bd/NGV technology. Still further, the V2X communication device could receive at least a part of the service information based on a cellular radio technology. The V2X communication device may receive at least a part of the service information in a V2X communication service in the first frequency spectrum, in particular in a dedicated ITS frequency band. Further, the V2X communication device may receive at least a part of the service information through a cellular network interface in the first frequency spectrum, e.g., in the above-mentioned second frequency band. In some scenarios, the V2X communication device may receive a first part of the service information through a cellular network interface in the first frequency spectrum, e.g., in the above-mentioned second frequency band, and receive a second part of the service information in a V2X communication service in the first frequency spectrum, in particular in a dedicated ITS frequency band.

At step 620, the V2X communication device may forward at least a part the service information received at step 610, e.g., as explained for the forwarded service information 403 and 404 in the example of FIG. 4. The V2X communication device may forward at least a part of the service information in a V2X communication service in the first frequency spectrum, in particular in a dedicated ITS frequency band.

At step 630, the V2X communication device controls utilization of one or more V2X services by the V2X communication device. This is accomplished based on the service information received at step 610. The controlling of utilization at step 630 may involve that based on the received service information, the V2X communication device starts utilization of the at least one V2X communication service in the second frequency spectrum, e.g., as explained for the vehicles 33, 34, 35, 36, 37, 38, 39, and 40 in the scenario of FIG. 3B, or as explained for the V2X communication devices 41 and 42 in the example of FIG. 4. In addition or as an alternative, the controlling of utilization at step 630 may involve that the V2X communication device stops utilization of at least one V2X communication service in the first frequency spectrum, e.g., as explained for the vehicles 34, 37, and 40 in the scenario of FIG. 3C or as explained for the V2X communication device 41 in the example of FIG. 4.

At step 640, the V2X communication device may participate in selection of one or more further V2X communication devices for forwarding information between the at least V2X communication service in the second frequency spectrum and at least one V2X communication service in the first frequency spectrum, e.g., as explained for the selection of delegates in the scenario of FIG. 3C or as explained for the forwarding of information or messages by the V2X communication device 42. The selection of step 640 may be based on positions of V2X communication devices utilizing the at least one V2X communication service in the second frequency spectrum. In particular, the selection of step 640 may be based on positions of V2X communication devices utilizing the at least one V2X communication service in the second frequency spectrum relative to positions of one or more V2X communication devices utilizing the at least one V2X communication service in the first frequency spectrum.

In some scenarios, the selection of step 640 may be performed in response to a V2X communication device starting utilization of the at least one V2X communication service in the second frequency spectrum or in response to a V2X communication device stopping utilization of the at least one V2X communication service in the second frequency spectrum. In addition or as an alternative, the selection of step 640 may be performed in response to determining a change of conditions for at least one V2X communication device utilizing the at least one V2X communication service in the second frequency spectrum.

The utilization of V2X services by the V2X communication device, e.g., as controlled at step 630, may involve that the V2X communication device transmits one or more messages of one or more of the V2X communication services in the first frequency spectrum or the second frequency spectrum, as indicated by step 650. Further, the utilization of V2X services by the V2X communication device, e.g., as controlled at step 630, may involve that the V2X communication device receives one or more messages of one or more of the V2X communication services in the first frequency spectrum or the second frequency spectrum, as indicated by step 660.

At step 670, the V2X communication device may forward one or more V2X messages and/or information from one or more V2X messages, e.g., the V2X message(s) received at step 660. Examples of such forwarding of information from one or more V2X messages or of one or more V2X messages are explained in connection with the scenario of FIG. 3C and in connection with the example of FIG. 4. Accordingly, in some scenarios the V2X communication device may receive one or more messages of at least one V2X communication service in the first frequency spectrum and forward information from the received one or more messages in the at least one V2X communication service in the second frequency spectrum. Further, the V2X communication device may receive one or more messages of the at least one V2X service in the second frequency spectrum and forward information from the received one or more messages in at least one V2X communication service in the first frequency spectrum.

Figure 7:
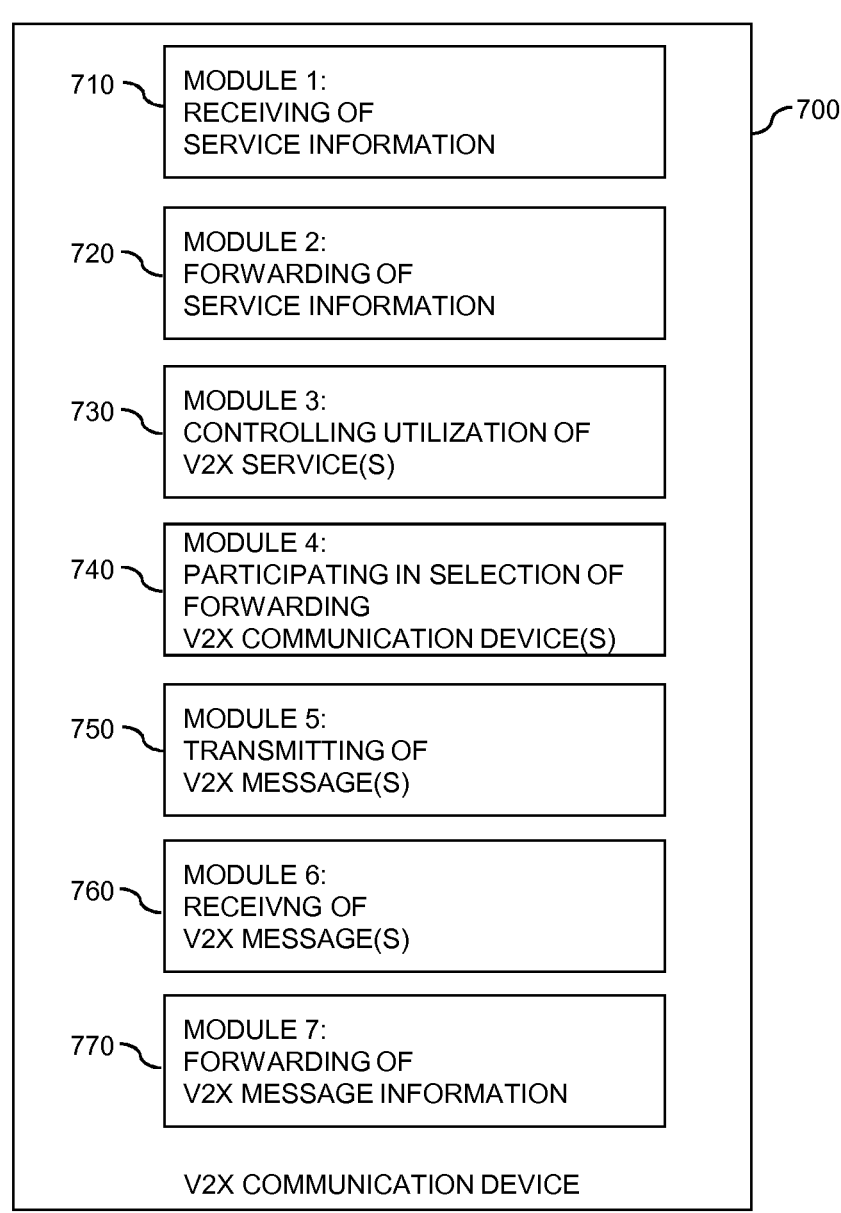
FIG. 7 shows an exemplary block diagram for illustrating functionalities of a V2X communication device implementing functionalities corresponding to the method of FIG. 6.

FIG. 7 shows a block diagram for illustrating functionalities of a V2X communication device 700 which operates according to the method of FIG. 6. The V2X communication device 700 may for example correspond to any of the above-mentioned entities 11, 12, 13, 14, 15 or to any of the above-mentioned vehicles 31, 32, 33, 34, 35, 36, 37, 38, 39,

40. As illustrated, the V2X communication device 700 may be provided with a module 710 configured to receive service information, such as explained in connection with step 610. Further, the V2X communication device 700 may optionally be provided with a module 720 configured to forward at least a part of the received service information, such as explained in connection with step 620. Further, the V2X communication device 700 may be provided with a module 730 configured to control utilization of V2X communication services by the V2X communication device 700, such as explained in connection with step 630. Further, the V2X communication device 700 may optionally be provided with a module 740 configured to participate in selection of one or more forwarding V2X communication devices, such as explained in connection with step 640. Further, the V2X communication device 700 may optionally be provided with a module 750 configured to transmit one or more V2X communication messages, such as explained in connection with step 650. Further, the V2X communication device 700 may optionally be provided with a module 760 configured to receive one or more V2X communication messages, such as explained in connection with step 660. Further, the V2X communication device 700 may optionally be provided with a module 770 configured to forward one or more V2X communication messages, such as explained in connection with step 670.

It is noted that the V2X communication device 700 may include further modules for implementing other functionalities, such as known functionalities of a V2X communication device. Further, it is noted that the modules of the V2X communication device 700 do not necessarily represent a hardware structure of the V2X communication device 700, but may also correspond to functional elements, e.g., implemented by hardware, software, or a combination thereof.

Figure 8:
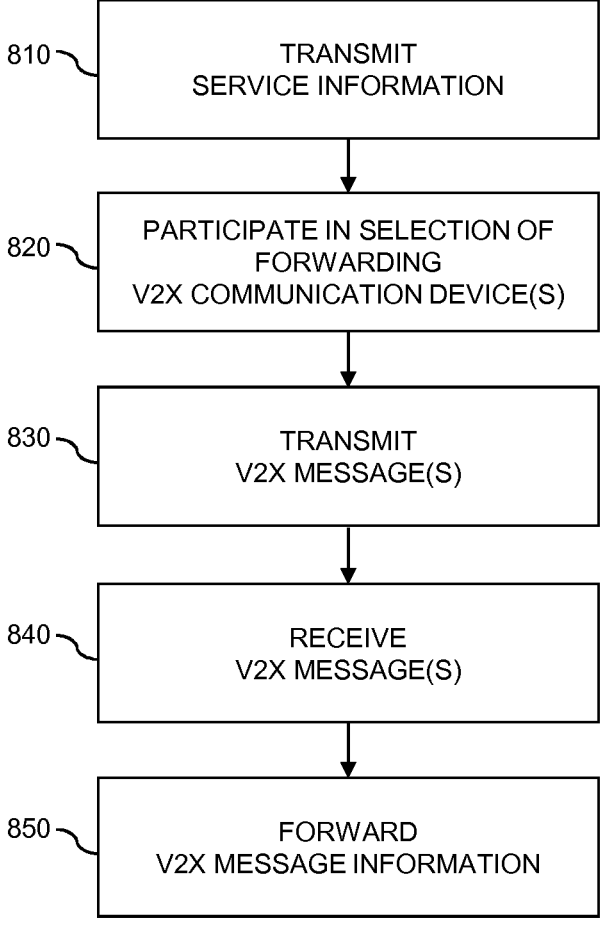
FIG. 8 shows a flowchart for illustrating a further method according to an embodiment of the invention.

FIG. 8 shows a flowchart for illustrating a further method of controlling V2X communication, which may be utilized for implementing the illustrated concepts. The method of FIG. 8 may be used for implementing the illustrated concepts in a V2X communication device, e.g., corresponding to any of the above-mentioned entities 11, 12, 13, 14, 15 or to any of the above-mentioned vehicles 31, 32, 33, 34, 35, 36, 37, 38, 39, 40.

If a processor-based implementation of the V2X communication device is used, at least some of the steps of the method of FIG. 8 may be performed and/or controlled by one or more processors of the V2X communication device. Such V2X communication device may also include a memory storing program code for implementing at least some of the below described functionalities or steps of the method of FIG. 8.

At step 810, the V2X communication device transmits service information in a first frequency spectrum. The service information indicates availability of at least one V2X communication service in a second frequency spectrum. Here, it is noted that the service information transmitted in the first frequency band may also indicate the availability in an indirect manner, by referring to further service information transmitted in the first frequency spectrum or in another frequency spectrum, e.g., on a broadcast channel. By way of example, the service information transmitted by the V2X communication device could include a reference to further service information transmitted by one or more access nodes of a wireless communication network, e.g., on a broadcast channel. Such indirect reference could also by iterated multiple times.

The first frequency spectrum may include a dedicated ITS frequency band, e.g., like for example explained for the first frequency band of FIG. 2. In addition, the first frequency spectrum may include at least one licensed frequency band e.g., like for example explained for the second frequency band of FIG. 2. The second frequency spectrum may include at least one licensed frequency band, e.g., like for example explained for the third, fourth, and fifth frequency band of FIG. 2.

The service information may indicate a type of the at least one V2X communication service in the second frequency spectrum. In addition or as an alternative, the service information may indicate one or more frequencies utilized for the at least one V2X communication service in the second frequency spectrum, e.g., in terms of one or more frequency bands, one or more frequency subbands, and/or one or more individual frequencies. In addition or as an alternative, the service information may indicate indicates a geographic area in which the at least one V2X communication service in the second frequency spectrum is available. In addition or as an alternative, the service information may indicate usage requirements for the at least one V2X communication service in the second frequency spectrum, e.g., a requirement related to charging conditions, a requirement related to a radio technology utilized for the at least one V2X communication service in the second frequency spectrum, or a requirement related to a communication protocol utilized for the at least one V2X communication service in the second frequency spectrum. In addition or as an alternative, the service information may indicate a usage status of the at least one V2X communication service in the second frequency spectrum, e.g., in terms of a number of users and/or in terms of an occupancy level.

The at least one V2X communication service in the second frequency spectrum may enable coordination of movements by vehicles of a group. For example, the at least one V2X communication service in the second frequency spectrum may correspond to a platooning service. In addition or as an alternative, the at least one V2X communication service in the second frequency spectrum may enable sharing of sensor data by vehicles of a group, e.g., for supporting automated driving functionalities.

The V2X communication device may transmit the service information based on a first radio technology, and the at least one V2X communication service in the second frequency spectrum may be based on a second radio technology which is different from the first radio technology. For example, the V2X communication device may transmit at least a part of the service information based on the LTE PC5 V2X interface or based on an ad-hoc radio technology like the ITS-G5 technology, the IEEE 802.11p/DSRC, or the IEEE 802.11bd/NGV technology. Still further, the V2X communication device could transmit at least a part of the service information based on a cellular radio technology. The V2X communication device may transmit at least a part of the service information in a V2X communication service in the first frequency spectrum, in particular in a dedicated ITS frequency band. Further, the V2X communication device may transmit at least a part of the service information through a cellular network interface in the first frequency spectrum, e.g., in the above-mentioned second frequency band. In some scenarios, the V2X communication device may transmit a first part of the service information through a cellular network interface in the first frequency spectrum, e.g., in the above-mentioned second frequency band, and transmit a second part of the service information in a V2X communication service in the first frequency spectrum, in particular in a dedicated ITS frequency band.

The V2X communication device may determine the service information from other information received by the V2X communication device, monitored by the V2X communication device, or otherwise available at the V2X communication device, e.g., through pre-configuration. Further, the V2X communication could also determine the transmitted service information from received service information, i.e., forward at least a part of service information received by the V2X communication device.

At step 820, the V2X communication device may participate in selection of one or more V2X communication devices for forwarding information between the at least V2X communication service in the second frequency spectrum and at least one V2X communication service in the first frequency spectrum, e.g., as explained for the selection of delegates in the scenario of FIG. 3C or as explained for the forwarding of information or messages by the V2X communication device 42. The selection of step 820 may be based on positions of V2X communication devices utilizing the at least one V2X communication service in the second frequency spectrum. In particular, the selection of step 820 may be based on positions of V2X communication devices utilizing the at least one V2X communication service in the second frequency spectrum relative to positions of one or more V2X communication devices utilizing the at least one V2X communication service in the first frequency spectrum.

In some scenarios, the selection of step 820 may be performed in response to a V2X communication device starting utilization of the at least one V2X communication service in the second frequency spectrum or in response to a V2X communication device stopping utilization of the at least one V2X communication service in the second frequency spectrum. In addition or as an alternative, the selection of step 820 may be performed in response to determining a change of conditions for at least one V2X communication device utilizing the at least one V2X communication service in the second frequency spectrum.

As indicated by step 830, the V2X communication device may also transmit one or more messages of one or more of the V2X communication services in the first frequency spectrum or the second frequency spectrum. Further, the V2X communication device may receive one or more messages of one or more of the V2X communication services in the first frequency spectrum or the second frequency spectrum, as indicated by step 840. At step 850, the V2X communication device may forward one or more V2X messages and/or information from one or more V2X messages, e.g., the V2X message(s) received at step 830. Examples of such forwarding of information from one or more V2X messages or of one or more V2X messages are explained in connection with the scenario of FIG. 3C and in connection with the example of FIG. 4. Accordingly, in some scenarios the V2X communication device may receive one or more messages of at least one V2X communication service in the first frequency spectrum and forward information from the received one or more messages in the at least one V2X communication service in the second frequency spectrum. Further, the V2X communication device may receive one or more messages of the at least one V2X service in the second frequency spectrum and forward information from the received one or more messages in at least one V2X communication service in the first frequency spectrum.

Figure 9:
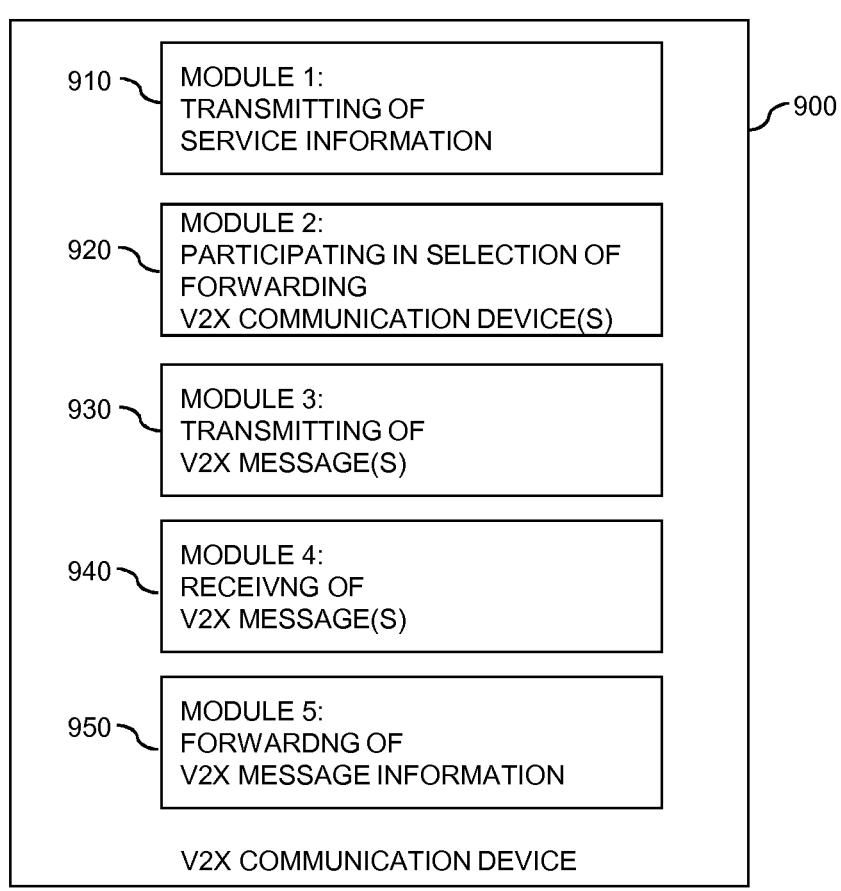
FIG. 9 shows an exemplary block diagram for illustrating functionalities of a V2X communication device implementing functionalities corresponding to the method of FIG. 8.

FIG. 9 shows a block diagram for illustrating functionalities of a V2X communication device 900 which operates according to the method of FIG. 8. The V2X communication device 900 may for example correspond to any of the above-mentioned entities 11, 12, 13, 14, 15 or to any of the above-mentioned vehicles 31, 32, 33, 34, 35, 36, 37, 38, 39, 40. As illustrated, the V2X communication device 900 may be provided with a module 910 configured to transmit service information, such as explained in connection with step 810. Further, the V2X communication device 900 may optionally be provided with a module 920 configured to participate in selection of one or more forwarding V2X communication devices, such as explained in connection with step 820. Further, the V2X communication device 900 may optionally be provided with a module 930 configured to transmit one or more V2X communication messages, such as explained in connection with step 830. Further, the V2X communication device 900 may optionally be provided with a module 960 configured to receive one or more V2X communication messages, such as explained in connection with step 840. Further, the V2X communication device 900 may optionally be provided with a module 950 configured to forward one or more V2X communication messages, such as explained in connection with step 850.

It is noted that the V2X communication device 900 may include further modules for implementing other functionalities, such as known functionalities of a V2X communication device. Further, it is noted that the modules of the V2X communication device 900 do not necessarily represent a hardware structure of the V2X communication device 900, but may also correspond to functional elements, e.g., implemented by hardware, software, or a combination thereof.

It is noted that functionalities as explained in connection with FIGS. 6 and 7 could also be combined with functionalities as explained in connection with FIGS. 8 and 9 in the same V2X communication device. For example, a V2X communication device receiving and utilizing service information in accordance with the method of FIG. 6 could further also determine and transmit service information in accordance with the method of FIG. 8 and optionally also utilize this service information in the same way as explained for the service information received according to the method of FIG. 6.

Figure 10:
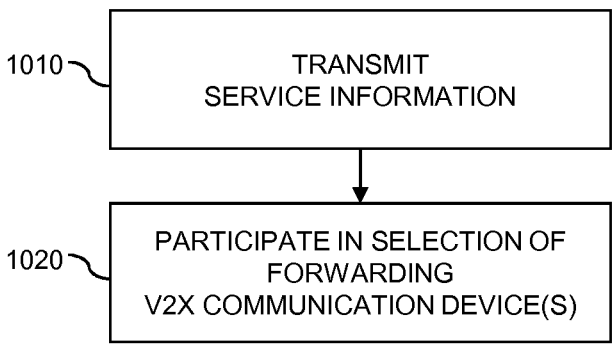
FIG. 10 shows a flowchart for illustrating a further method according to an embodiment of the invention.

FIG. 10 shows a flowchart for illustrating a further method of controlling V2X communication, which may be utilized for implementing the illustrated concepts. The method of FIG. 10 may be used for implementing the illustrated concepts in a network node, e.g., corresponding to the above-mentioned access node 100.

If a processor-based implementation of the network node is used, at least some of the steps of the method of FIG. 10 may be performed and/or controlled by one or more processors of the network node. Such network node may also include a memory storing program code for implementing at least some of the below described functionalities or steps of the method of FIG. 10.

At step 1010, the network node transmits service information in a first frequency spectrum. The service information indicates availability of at least one V2X communication service in a second frequency spectrum. Here, it is noted that the service information transmitted in the first frequency band may also indicate the availability in an indirect manner, by referring to further service information transmitted in the first frequency spectrum or in another frequency spectrum, e.g., on a broadcast channel. By way of example, the service information transmitted by the network node could include a reference to further service information transmitted by one or more other network nodes, such as access nodes of a wireless communication network, e.g., on a broadcast channel. Such indirect reference could also by iterated multiple times.

The first frequency spectrum may include a dedicated ITS frequency band, e.g., like for example explained for the first frequency band of FIG. 2. In addition, the first frequency spectrum may include at least one licensed frequency band e.g., like for example explained for the second frequency band of FIG. 2. The second frequency spectrum may include at least one licensed frequency band, e.g., like for example explained for the third, fourth, and fifth frequency band of FIG. 2.

The service information may indicate a type of the at least one V2X communication service in the second frequency spectrum. In addition or as an alternative, the service information may indicate one or more frequencies utilized for the at least one V2X communication service in the second frequency spectrum, e.g., in terms of one or more frequency bands, one or more frequency subbands, and/or one or more individual frequencies. In addition or as an alternative, the service information may indicate indicates a geographic area in which the at least one V2X communication service in the second frequency spectrum is available. In addition or as an alternative, the service information may indicate usage requirements for the at least one V2X communication service in the second frequency spectrum, e.g., a requirement related to charging conditions, a requirement related to a radio technology utilized for the at least one V2X communication service in the second frequency spectrum, or a requirement related to a communication protocol utilized for the at least one V2X communication service in the second frequency spectrum. In addition or as an alternative, the service information may indicate a usage status of the at least one V2X communication service in the second frequency spectrum, e.g., in terms of a number of users and/or in terms of an occupancy level.

The at least one V2X communication service in the second frequency spectrum may enable coordination of movements by vehicles of a group. For example, the at least one V2X communication service in the second frequency spectrum may correspond to a platooning service. In addition or as an alternative, the at least one V2X communication service in the second frequency spectrum may enable sharing of sensor data by vehicles of a group, e.g., for supporting automated driving functionalities.

The network node may transmit the service information based on a first radio technology, and the at least one V2X communication service in the second frequency spectrum may be based on a second radio technology which is different from the first radio technology. For example, the network node may transmit at least a part of the service information based on a cellular radio technology, through a cellular network interface in the first frequency spectrum, e.g., in the above-mentioned second frequency band.

The network node may determine the service information from other information received by the network node, monitored by the network node, or otherwise available at the network node, e.g., through pre-configuration. Further, the network node could also determine the transmitted service information from received service information, i.e., forward at least a part of service information received by the network node.

At step 1020, the network node may participate in selection of one or more V2X communication devices for forwarding information between the at least V2X communication service in the second frequency spectrum and at least one V2X communication service in the first frequency spectrum, e.g., as explained for the selection of delegates in the scenario of FIG. 3C or as explained for the forwarding of information or messages by the V2X communication device 42. The selection of step 1020 may be based on positions of V2X communication devices utilizing the at least one V2X communication service in the second frequency spectrum. In particular, the selection of step 820 may be based on positions of V2X communication devices utilizing the at least one V2X communication service in the second frequency spectrum relative to positions of one or more V2X communication devices utilizing the at least one V2X communication service in the first frequency spectrum.

In some scenarios, the selection of step 1020 may be performed in response to a V2X communication device starting utilization of the at least one V2X communication service in the second frequency spectrum or in response to a V2X communication device stopping utilization of the at least one V2X communication service in the second frequency spectrum. In addition or as an alternative, the selection of step 1020 may be performed in response to determining a change of conditions for at least one V2X communication device utilizing the at least one V2X communication service in the second frequency spectrum.

Figure 11:
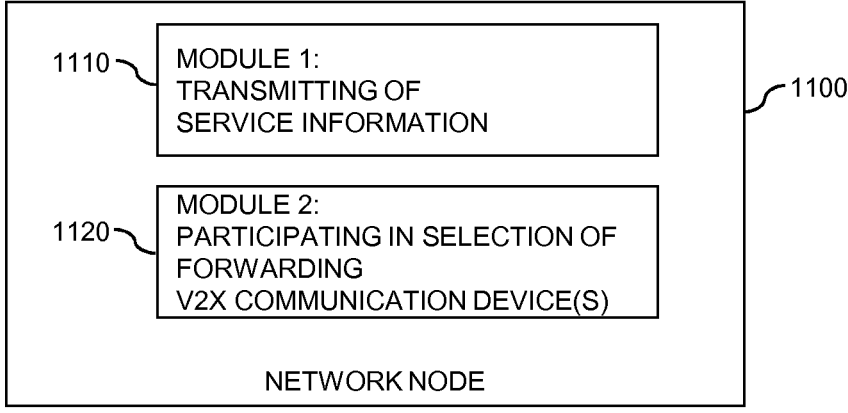
FIG. 11 shows an exemplary block diagram for illustrating functionalities of a network node implementing functionalities corresponding to the method of FIG. 8.

FIG. 11 shows a block diagram for illustrating functionalities of a network node 1100 which operates according to the method of FIG. 10. The network node 1100 may for example correspond to the above-mentioned access node 100. As illustrated, the network node 1100 may be provided with a module 1110 configured to transmit service information, such as explained in connection with step 1010. Further, the network node 1100 may optionally be provided with a module 1120 configured to participate in selection of one or more forwarding V2X communication devices, such as explained in connection with step 1020.

It is noted that the network node 1100 may include further modules for implementing other functionalities, such as known functionalities of an access node or other type of network node. Further, it is noted that the modules of the network node 1100 do not necessarily represent a hardware structure of the network node 1100, but may also correspond to functional elements, e.g., implemented by hardware, software, or a combination thereof.

It is noted that functionalities as explained in connection with FIGS. 6 and 7 and/or functionalities as explained in connection with FIGS. 8 and 9 could also be combined with functionalities as explained in connection with FIGS. 10 and 11, e.g., in a system including a network node transmitting service information in accordance with the method of FIG. 10 and one or more V2X communication devices receiving and utilizing the service information in accordance with the method of FIG. 6. In addition or as an alternative to the access node, such system could also include one or more V2X communication devices transmitting service information in accordance with the method of FIG. 8.

Figure 12:
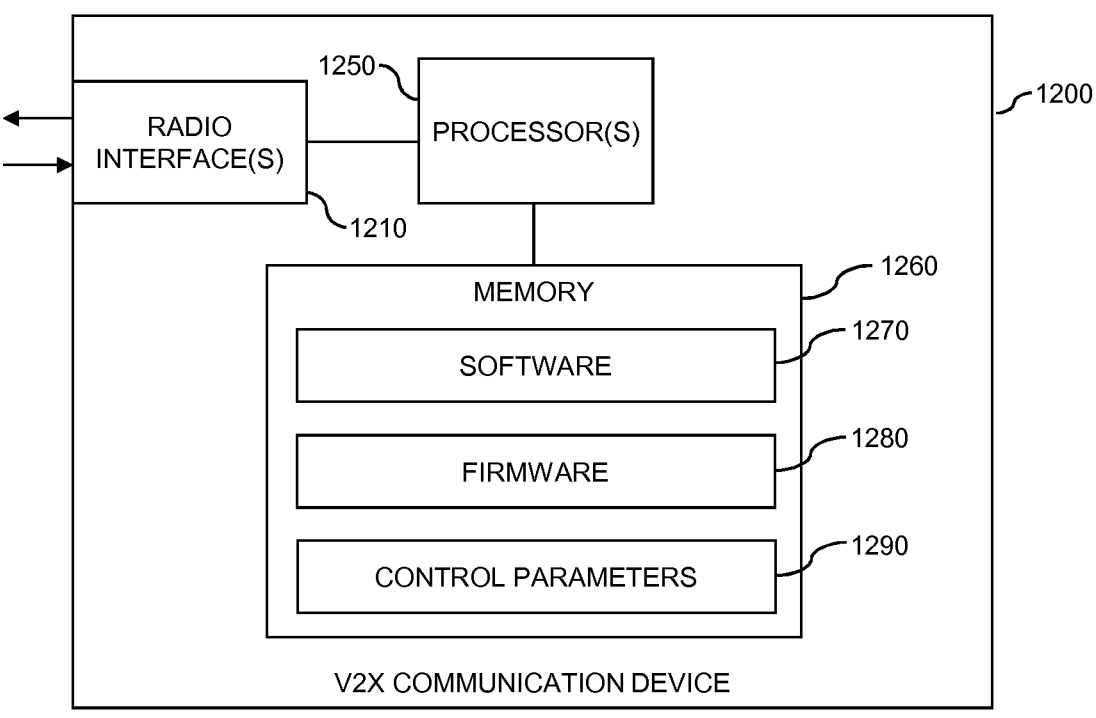
FIG. 12 schematically illustrates structures of a V2X communication device according to an embodiment of the invention.

FIG. 12 illustrates a processor-based implementation of a V2X communication device 1200 which may be used for implementing the above-described concepts. For example, the structures as illustrated in FIG. 12 may be used for implementing the concepts in any of the above-mentioned entities 11, 12, 13, 14, 15 or any of the above-mentioned vehicles 31, 32, 33, 34, 35, 36, 37, 38, 39, 40.

As illustrated, the V2X communication device 1200 includes one or more radio interfaces 1210. The radio interface(s) 1210 may for example support one or more of the above-mentioned V2X communication technologies. Further, the radio interface(s) 1210 could also support DL radio transmissions and/or UL radio transmissions based on a cellular radio technology, e.g., the UMTS technology, the LTE technology, and/or the NR technology.

Further, the V2X communication device 1200 may include one or more processors 1250 coupled to the radio interface(s) 1210 and a memory 1260 coupled to the processor(s) 1250. By way of example, the radio interface(s) 1210, the processor(s) 1250, and the memory 1260 could be coupled by one or more internal bus systems of the radio device 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270, firmware 1280, and/or control parameters 1290. The memory 1260 may include suitably configured program code to be executed by the processor(s) 1250 so as to implement the above-described functionalities of a V2X communication device, such as explained in connection with FIGS. 6 to 9.

It is to be understood that the structures as illustrated in FIG. 12 are merely schematic and that the V2X communication device 1200 may actually include further components which, for the sake of clarity, have not been illustrated, e.g., further interfaces or processors. Also, it is to be understood that the memory 1260 may include further program code for implementing known functionalities of a V2X communication device, e.g., for implementing V2X various kinds of V2X or eV2X services. According to some embodiments, also a computer program may be provided for implementing functionalities of the V2X communication device 1200, e.g., in the form of a physical medium storing the program code and/or other data to be stored in the memory 1260 or by making the program code available for download or by streaming.

Figure 13:
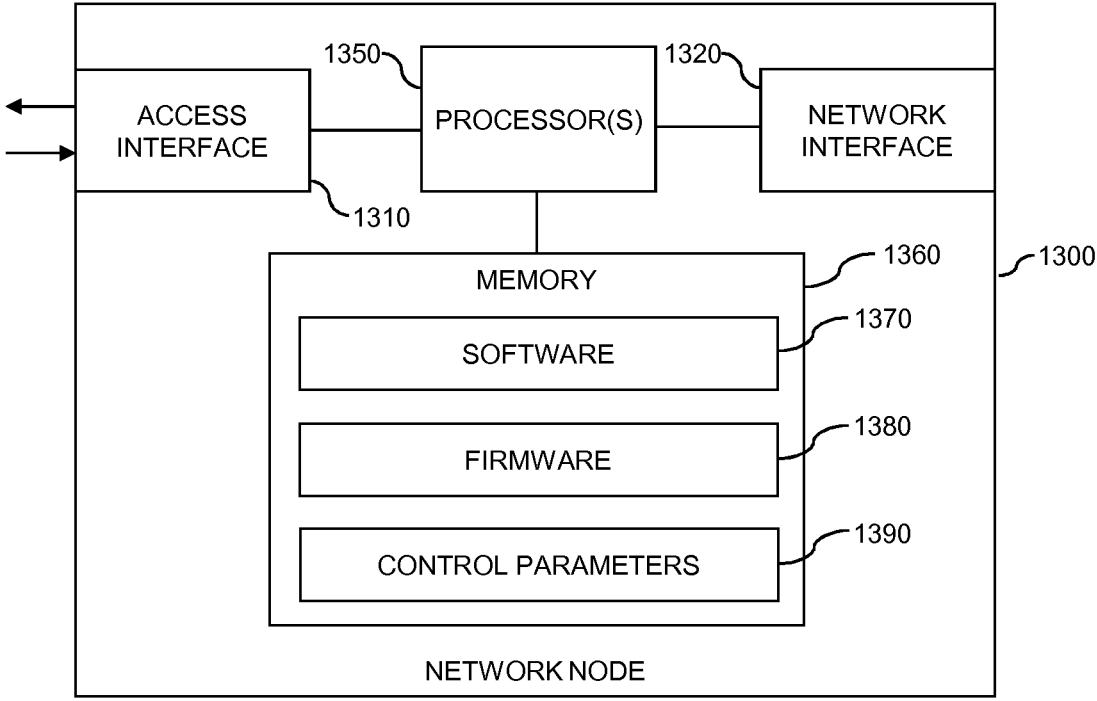
FIG. 13 schematically illustrates structures of a network node according to an embodiment of the invention.

FIG. 13 illustrates a processor-based implementation of a network node 1300 which may be used for implementing the above described concepts. For example, the structures as illustrated in FIG. 13 may be used for implementing the concepts in the above-mentioned access node 100.

As illustrated, the network node 1300 includes an access interface 1310. The access interface 1310 may be used for communication with one or more radio devices by DL radio transmissions and/or UL radio transmissions and for controlling these radio devices. The radio devices may in particular include V2X communication devices, e.g., corresponding to any of the above-mentioned entities 11, 12, 13, 14, 15 or any of the above-mentioned vehicles 31, 32, 33, 34, 35, 36, 37, 38, 39, 40. If the network node corresponds to an access node, the access interface 1310 may be a radio interface. However, in some scenarios the network node 1300 could also correspond to a more centralized node, e.g., a core network node. In this case, the access interface 1300 could also correspond to an interface for communication with an access node serving the radio devices. As further illustrated, the network node 1300 may also include a network interface 1320 which may be used for communication with other network nodes.

Further, the network node 1300 may include one or more processors 1350 coupled to the access interface 1310 and a memory 1360 coupled to the processor(s) 1350. By way of example, the access interface 1310, the processor(s) 1350, and the memory 1360 could be coupled by one or more internal bus systems of the network node 1300. The memory 1360 may include a ROM, e.g., a flash ROM, a RAM, e.g., a DRAM or SRAM, a mass storage, e.g., a hard disk or solid state disk, or the like. As illustrated, the memory 1360 may include software 1370, firmware 1380, and/or control parameters 1390. The memory 1360 may include suitably configured program code to be executed by the processor(s) 1350 so as to implement the above-described functionalities of a network node, such as explained in connection with FIGS. 10 and 11.

It is to be understood that the structures as illustrated in FIG. 13 are merely schematic and that the network node 1300 may actually include further components which, for the sake of clarity, have not been illustrated, e.g., further interfaces or processors. Also, it is to be understood that the memory 1360 may include further program code for implementing known functionalities of an eNB of the LTE technology, a gNB of the NR technology, or other network node. According to some embodiments, also a computer program may be provided for implementing functionalities of the network node 1300, e.g., in the form of a physical medium storing the program code and/or other data to be stored in the memory 1360 or by making the program code available for download or by streaming.

As can be seen, the concepts as described above may be used for efficiently coordinating provision of one or more V2X services. Specifically, by advertising one or more eV2X services in another frequency spectrum, problems due to insufficient bandwidth in a dedicated ITS frequency band can be avoided. Further, the concepts may be used to further reduce the traffic load of basic V2X services in the first frequency spectrum, in particular in the dedicated ITS frequency band, by electing the delegates among users of the a certain basic V2X service from the group of eV2X service users, and only allowing the delegates to transmit/receive messages of this basic V2X service messages in the dedicated ITS frequency band, also on behalf of users of the same basic V2X service in the group of eV2X service users. Accordingly, safety related functionalities of the basic V2X service can be maintained, without requiring that all users in the group of eV2X service users continue utilizing the basic V2X service. For users which do not act as delegates, the safety-related information in the messages of the basic V2X service can be conveyed in messages of the eV2X service.

It is to be understood that the examples and embodiments as explained above are merely illustrative and susceptible to various modifications. For example, the illustrated concepts may be applied in connection with various kinds of V2X radio technologies and combinations of radio technologies. Further, the concepts may be applied with respect to various types of vehicles and eV2X service types. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided by the present disclosure include:

Embodiment 1

A method of controlling vehicle-to-anything, V2X, communication, the method comprising:

a V2X communication device (11, 12, 13, 14, 15; 31, 32, 33, 34, 35, 36, 37, 38, 39, 40; 41, 42, 43; 700; 1200) receiving service information in a first frequency spectrum, the service information indicating availability of at least one V2X communication service in a second frequency spectrum; and based on the received service information, the V2X communication device (11, 12, 13, 14, 15; 31, 32, 33, 34, 35, 36, 37, 38, 39, 40; 41, 42, 43; 700; 1200) controlling utilization of one or more V2X communication services by the V2X communication device (11, 12, 13, 14, 15; 31, 32, 33, 34, 35, 36, 37, 38, 39, 40; 41, 42, 43; 700; 1200).

Embodiment 2

The method according to embodiment 1, further comprising:

based on the received service information, the V2X communication device (11, 12, 13, 14, 15; 31, 32, 33, 34, 35, 36, 37, 38, 39, 40; 41, 42, 43; 700; 1200) starting utilization of the at least one V2X communication service in the second frequency spectrum.

Embodiment 3

The method according to embodiment 2, further comprising:

the V2X communication device (11, 12, 13, 14, 15; 31, 32, 33, 34, 35, 36, 37, 38, 39, 40; 41, 42, 43; 700; 1200) stopping utilization of at least one V2X communication service in the first frequency spectrum.

Embodiment 4

The method according to embodiment 2, further comprising:

the V2X communication device (11, 12, 13, 14, 15; 31, 32, 33, 34, 35, 36, 37, 38, 39, 40; 41, 42, 43; 700; 1200) receiving one or more messages of at least one V2X communication service in the first frequency spectrum; and the V2X communication device (11, 12, 13, 14, 15; 31, 32, 33, 34, 35, 36, 37, 38, 39, 40; 41, 42, 43; 700; 1200) forwarding information from the received one or more messages in the at least one V2X communication service in the second frequency spectrum.

Embodiment 5

The method according to embodiment 2 or 4, further comprising:

the V2X communication device (11, 12, 13, 14, 15; 31, 32, 33, 34, 35, 36, 37, 38, 39, 40; 41, 42, 43; 700; 1200) receiving one or more messages of the at least one V2X service in the second frequency spectrum; and the V2X communication device (11, 12, 13, 14, 15; 31, 32, 33, 34, 35, 36, 37, 38, 39, 40; 41, 42, 43; 700; 1200) forwarding information from the received one or more messages in at least one V2X communication service in the first frequency spectrum.

Embodiment 6

The method according to any one of embodiments 2 to 5, the V2X communication device (11, 12, 13, 14, 15; 31, 32, 33, 34, 35, 36, 37, 38, 39, 40; 41, 42, 43; 700; 1200) participating in selection of a V2X communication device (11, 12, 13, 14, 15; 31, 32, 33, 34, 35, 36, 37, 38, 39, 40; 41, 42, 43; 700; 900; 1200) for forwarding of information between the at least V2X communication service in the second frequency spectrum and at least one V2X communication service in the first frequency spectrum.

Embodiment 7

The method according to embodiment 6,
wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 8

The method according to embodiment 7,
wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum relative to positions of one or more V2X communication devices (11, 12, 13, 14, 15; 31, 32, 33, 34, 35, 36, 37, 38, 39, 40; 41, 42, 43; 700; 900; 1200) utilizing the at least one V2X communication service in the first frequency spectrum.

Embodiment 9

The method according to any one of embodiments 6 to 8, wherein the selection is performed in response to a V2X communication device (11, 12, 13, 14, 15; 31, 32, 33, 34, 35, 36, 37, 38, 39, 40; 41, 42, 43; 700; 900; 1200) starting utilization of the at least one V2X communication service in the second frequency spectrum or in response to a V2X communication device (11, 12, 13, 14, 15; 31, 32, 33, 34, 35, 36, 37, 38, 39, 40; 41, 42, 43; 700; 900; 1200) stopping utilization of the at least one V2X communication service in the second frequency spectrum.

Embodiment 10

The method according to any one of embodiments 6 to 9, wherein the selection is performed in response to determining a change of conditions for at least one V2X communication device (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 11

The method according to any one of the preceding embodiments,
wherein the V2X communication device (11, 12, 13, 14, 15; 31, 32, 33, 34, 35, 36, 37, 38, 39, 40; 41, 42, 43; 700; 1200) receives at least a part of the service information in a V2X communication service in the first frequency spectrum.

Embodiment 12

The method according to any one of the preceding embodiments,
wherein the V2X communication device (11, 12, 13, 14, 15; 31, 32, 33, 34, 35, 36, 37, 38, 39, 40; 41, 42, 43;

700; 1200) receives at least a part of the service information through a cellular network interface in the first frequency spectrum.

Embodiment 13

The method according to any one of the preceding embodiments, wherein the V2X communication device (11, 12, 13, 14, 15; 31, 32, 33, 34, 35, 36, 37, 38, 39, 40; 41, 42, 43; 700; 1200) forwards at least a part of the received service information in at least one V2X communication service in the first frequency spectrum.

Embodiment 14

The method according to any one of the preceding embodiments, wherein the service information indicates a type of the at least one V2X communication service in the second frequency spectrum.

Embodiment 15

The method according to any one of the preceding embodiments, wherein the service information indicates one or more frequencies utilized for the at least one V2X communication service in the second frequency spectrum.

Embodiment 16

The method according to any one of the preceding embodiments, wherein the service information indicates a geographic area in which the at least one V2X communication service in the second frequency spectrum is available.

Embodiment 17

The method according to any one of the preceding embodiments, wherein the service information indicates usage requirements for the at least one V2X communication service in the second frequency spectrum.

Embodiment 18

The method according to any one of the preceding embodiments, wherein the service information indicates a usage status of the at least one V2X communication service in the second frequency spectrum.

Embodiment 19

The method according to any one of the preceding embodiments, wherein the at least one V2X communication service in the second frequency spectrum enables coordination of movements by vehicles of a group.

Embodiment 20

The method according to any one of the preceding embodiments, wherein the at least one V2X communication service in the second frequency spectrum enables sharing of sensor data by vehicles of a group.

Embodiment 21

The method according to any one of the preceding embodiments, wherein the V2X communication device (11, 12, 13, 14, 15; 31, 32, 33, 34, 35, 36, 37, 38, 39, 40; 41, 42, 43; 700; 1200) receives the service information based on a first radio technology and the at least one V2X communication service in the second frequency spectrum is based on a second radio technology which is different from the first radio technology.

Embodiment 22

The method according to any one of the preceding embodiments, wherein the first frequency spectrum comprises a dedicated intelligent transport systems (ITS) frequency band.

Embodiment 23

The method according to any one of the preceding embodiments, wherein the second frequency spectrum comprises at least one licensed frequency band.

Embodiment 24

A method of controlling vehicle-to-anything, V2X, communication, the method comprising:

in a first frequency spectrum, a V2X communication device (11, 12, 13, 14, 15; 31, 32, 33, 34, 35, 36, 37, 38, 39, 40; 41, 42, 43; 900; 1200) transmitting service information to one or more further V2X communication devices (11, 12, 13, 14, 15; 31, 32, 33, 34, 35, 36, 37, 38, 39, 40; 41, 42, 43; 700; 900; 1200), the service information indicating availability of at least one V2X communication service in a second frequency spectrum.

Embodiment 25

The method according to embodiment 24, the V2X communication device (11, 12, 13, 14, 15; 31, 32, 33, 34, 35, 36, 37, 38, 39, 40; 41, 42, 43; 900; 1200) participating in selection of a V2X communication device for forwarding of information between the at least V2X communication service in the second frequency spectrum and at least one V2X communication service in the first frequency spectrum.

Embodiment 26

The method according to embodiment 25, wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 27

The method according to embodiment 26,
wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum relative to positions of one or more V2X communication devices (11, 12, 13, 14, 15; 31, 32, 33, 34, 35, 36, 37, 38, 39, 40; 41, 42, 43; 700; 900; 1200) utilizing the at least one V2X communication service in the first frequency spectrum.

Embodiment 28

The method according to any one of embodiments 25 to 27,
wherein the selection is performed in response to a V2X communication device (11, 12, 13, 14, 15; 31, 32, 33, 34, 35, 36, 37, 38, 39, 40; 41, 42, 43; 700; 900; 1200) starting utilization of the at least one V2X communication service in the second frequency spectrum or in response to a V2X communication device (11, 12, 13, 14, 15; 31, 32, 33, 34, 35, 36, 37, 38, 39, 40; 41, 42, 43; 700; 900; 1200) stopping utilization of the at least one V2X communication service in the second frequency spectrum.

Embodiment 29

The method according to any one of embodiments 25 to 28,
wherein the selection is performed in response to determining a change of conditions for at least one V2X communication device (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 30

The method according to any one of embodiments 24 to 29,
wherein the V2X communication device (11, 12, 13, 14, 15; 31, 32, 33, 34, 35, 36, 37, 38, 39, 40; 41, 42, 43; 900; 1200) transmits at least a part of the service information in a V2X communication service in the first frequency spectrum.

Embodiment 31

The method according to any one of embodiments 24 to 20,
wherein the V2X communication device (11, 12, 13, 14, 15; 31, 32, 33, 34, 35, 36, 37, 38, 39, 40; 41, 42, 43; 900; 1200) transmits at least a part of the service information through a cellular network interface in the first frequency spectrum.

Embodiment 32

The method according to any one of embodiments 24 to 31,
wherein the service information indicates a type of the at least one V2X communication service in the second frequency spectrum.

Embodiment 33

The method according to any one of embodiments 24 to 32,
wherein the service information indicates one or more frequencies utilized for the at least one V2X communication service in the second frequency spectrum.

Embodiment 34

The method according to any one of embodiments 24 to 33,
wherein the service information indicates a geographic area in which the at least one V2X communication service in the second frequency spectrum is available.

Embodiment 35

The method according to any one of embodiments 24 to 34,
wherein the service information indicates usage requirements for the at least one V2X communication service in the second frequency spectrum.

Embodiment 36

The method according to any one of embodiments 24 to 35,
wherein the service information indicates a usage status of the at least one V2X communication service in the second frequency spectrum.

Embodiment 37

The method according to any one of embodiments 24 to 36,
wherein the at least one V2X communication service in the second frequency spectrum enables coordination of movements by vehicles of a group.

Embodiment 38

The method according to any one of embodiments 24 to 37,
wherein the at least one V2X communication service in the second frequency spectrum enables sharing of sensor data by vehicles of a group.

Embodiment 39

The method according to any one of embodiments 24 to 38,
wherein the V2X communication device (11, 12, 13, 14, 15; 31, 32, 33, 34, 35, 36, 37, 38, 39, 40; 41, 42, 43; 900; 1200) transmits the service information based on a first radio technology and the at least one V2X communication service in the second frequency spectrum is based on a second radio technology which is different from the first radio technology.

Embodiment 40

The method according to any one of embodiments 24 to 39,
wherein the first frequency spectrum comprises a dedicated intelligent transport systems (ITS) frequency band.

Embodiment 41

The method according to any one of embodiments 24 to 40, wherein the second frequency spectrum comprises at least one licensed frequency band.

Embodiment 42

A method of controlling vehicle-to-anything, V2X, communication, the method comprising:

in a first frequency spectrum, a node (100; 1300) of a wireless communication network transmitting service information to one or more V2X communication devices (11, 12, 13, 14, 15; 31, 32, 33, 34, 35, 36, 37, 38, 39, 40; 41, 42, 43; 700; 900; 1200), the service information indicating availability of at least one V2X communication service in a second frequency spectrum.

Embodiment 43

The method according to embodiment 42, the node (100) participating in selection of a V2X communication device (11, 12, 13, 14, 15; 31, 32, 33, 34, 35, 36, 37, 38, 39, 40; 41, 42, 43; 700; 900; 1200) for forwarding of information between the at least V2X communication service in the second frequency spectrum and at least one V2X communication service in the first frequency spectrum.

Embodiment 44

The method according to embodiment 43, wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 45

The method according to embodiment 44, wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum relative to positions of one or more V2X communication devices (11, 12, 13, 14, 15; 31, 32, 33, 34, 35, 36, 37, 38, 39, 40; 41, 42, 43; 700; 900; 1200) utilizing the at least one V2X communication service in the first frequency spectrum.

Embodiment 46

The method according to any one of embodiments 43 to 45, wherein the selection is performed in response to a V2X communication device (11, 12, 13, 14, 15; 31, 32, 33, 34, 35, 36, 37, 38, 39, 40; 41, 42, 43; 700; 900; 1200) starting utilization of the at least one V2X communication service in the second frequency spectrum or in response to a V2X communication device (11, 12, 13, 14, 15; 31, 32, 33, 34, 35, 36, 37, 38, 39, 40; 41, 42, 43; 700; 900; 1200) stopping utilization of the at least one V2X communication service in the second frequency spectrum.

Embodiment 47

The method according to any one of embodiments 43 to 46, wherein the selection is performed in response to determining a change of conditions for at least one V2X communication device (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 48

The method according to any one of embodiments 42 to 47, wherein the node (100; 1300) transmits at least a part of the service information in through a cellular network interface in the first frequency spectrum.

Embodiment 49

The method according to any one of embodiments 42 to 48, wherein the service information indicates a type of the at least one V2X communication service in the second frequency spectrum.

Embodiment 50

The method according to any one of embodiments 42 to 49, wherein the service information indicates one or more frequencies utilized for the at least one V2X communication service in the second frequency spectrum.

Embodiment 51

The method according to any one of embodiments 42 to 50, wherein the service information indicates a geographic area in which the at least one V2X communication service in the second frequency spectrum is available.

Embodiment 52

The method according to any one of embodiments 42 to 51, wherein the service information indicates usage requirements for the at least one V2X communication service in the second frequency spectrum.

Embodiment 53

The method according to any one of embodiments 42 to 52, wherein the service information indicates a usage status of the at least one V2X communication service in the second frequency spectrum.

Embodiment 54

The method according to any one of embodiments 42 to 53, wherein the at least one V2X communication service in the second frequency spectrum enables coordination of movements by vehicles of a group.

Embodiment 55

The method according to any one of embodiments 42 to 54,
wherein the at least one V2X communication service in the second frequency spectrum enables sharing of sensor data by vehicles of a group.

Embodiment 56

The method according to any one of embodiments 42 to 55,
wherein the node (100; 1300) transmits the service information based on a first radio technology and the at least one V2X communication service in the second frequency spectrum is based on a second radio technology which is different from the first radio technology.

Embodiment 57

The method according to any one of embodiments 42 to 56,
wherein the first frequency spectrum comprises a dedicated intelligent transport systems (ITS) frequency band.

Embodiment 58

The method according to any one of embodiments 42 to 57,
wherein the second frequency spectrum comprises at least one licensed frequency band.

Embodiment 59

A vehicle-to-anything, V2X, communication device (11, 12, 13, 14, 15; 31, 32, 33, 34, 35, 36, 37, 38, 39, 40; 41, 42, 43; 700; 1200), the V2X communication device (11, 12, 13, 14, 15; 31, 32, 33, 34, 35, 36, 37, 38, 39, 40; 41, 42, 43; 700; 1200) being configured to:
receive service information in a first frequency spectrum, the service information indicating availability of at least one V2X communication service in a second frequency spectrum; and
based on the received service information, control utilization of one or more V2X communication services by the V2X communication device (11, 12, 13, 14, 15; 31, 32, 33, 34, 35, 36, 37, 38, 39, 40; 41, 42, 43; 700; 1200).

Embodiment 60

The V2X communication device (11, 12, 13, 14, 15; 31, 32, 33, 34, 35, 36, 37, 38, 39, 40; 41, 42, 43; 700; 1200) according to embodiment 59, wherein the V2X communication device (11, 12, 13, 14, 15; 31, 32, 33, 34, 35, 36, 37, 38, 39, 40; 41, 42, 43; 700; 1200) is further configured to:
based on the received service information, start utilization of the at least one V2X communication service in the second frequency spectrum.

Embodiment 61

The V2X communication device (11, 12, 13, 14, 15; 31, 32, 33, 34, 35, 36, 37, 38, 39, 40; 41, 42, 43; 700; 1200) according to embodiment 60, wherein the V2X communication device (11, 12, 13, 14, 15; 31, 32, 33, 34, 35, 36, 37, 38, 39, 40; 41, 42, 43; 700; 1200) is further configured to:
based on the received service information, stop utilization of at least one V2X communication service in the first frequency spectrum.

Embodiment 62

The V2X communication device (11, 12, 13, 14, 15; 31, 32, 33, 34, 35, 36, 37, 38, 39, 40; 41, 42, 43; 700; 1200) according to embodiment 60, wherein the V2X communication device (11, 12, 13, 14, 15; 31, 32, 33, 34, 35, 36, 37, 38, 39, 40; 41, 42, 43; 700; 1200) is further configured to:
receive one or more messages of at least one V2X communication service in the first frequency spectrum; and
forward information from the received one or more messages in the at least one V2X communication service in the second frequency spectrum.

Embodiment 63

The V2X communication device (11, 12, 13, 14, 15; 31, 32, 33, 34, 35, 36, 37, 38, 39, 40; 41, 42, 43; 700; 1200) according to embodiment 60 or 62, wherein the V2X communication device (11, 12, 13, 14, 15; 31, 32, 33, 34, 35, 36, 37, 38, 39, 40; 41, 42, 43; 700; 1200) is further configured to:
receive one or more messages of the at least one V2X service in the second frequency spectrum; and
forward information from the received one or more messages in at least one V2X communication service in the first frequency spectrum.

Embodiment 64

The V2X communication device (11, 12, 13, 14, 15; 31, 32, 33, 34, 35, 36, 37, 38, 39, 40; 41, 42, 43; 700; 1200) according to any one of embodiments 60 to 63, wherein the V2X communication device (11, 12, 13, 14, 15; 31, 32, 33, 34, 35, 36, 37, 38, 39, 40; 41, 42, 43; 700; 1200) is configured to participate in selection of a V2X communication device (11, 12, 13, 14, 15; 31, 32, 33, 34, 35, 36, 37, 38, 39, 40; 41, 42, 43; 700; 900; 1200) for forwarding of information between the at least V2X communication service in the second frequency spectrum and at least one V2X communication service in the first frequency spectrum.

Embodiment 65

The V2X communication device (11, 12, 13, 14, 15; 31, 32, 33, 34, 35, 36, 37, 38, 39, 40; 41, 42, 43; 700; 1200) according to embodiment 64,
wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 66

The V2X communication device (11, 12, 13, 14, 15; 31, 32, 33, 34, 35, 36, 37, 38, 39, 40; 41, 42, 43; 700; 1200) according to embodiment 65,
wherein the selection is based on positions of V2X communication devices (11, 12, 13, 14, 15; 31, 32, 33, 34, 35, 36, 37, 38, 39, 40; 41, 42, 43; 700; 900; 1200)

utilizing the at least one V2X communication service in the second frequency spectrum relative to positions of one or more V2X communication devices (11, 12, 13, 14, 15; 31, 32, 33, 34, 35, 36, 37, 38, 39, 40; 41, 42, 43; 700; 900; 1200) utilizing the at least one V2X communication service in the first frequency spectrum.

Embodiment 67

The V2X communication device (11, 12, 13, 14, 15; 31, 32, 33, 34, 35, 36, 37, 38, 39, 40; 41, 42, 43; 700; 1200) according to any one of embodiments 64 to 66,
    wherein the selection is performed in response to a V2X communication device (11, 12, 13, 14, 15; 31, 32, 33, 34, 35, 36, 37, 38, 39, 40; 41, 42, 43; 700; 900; 1200) starting utilization of the at least one V2X communication service in the second frequency spectrum or in response to a V2X communication device (11, 12, 13, 14, 15; 31, 32, 33, 34, 35, 36, 37, 38, 39, 40; 41, 42, 43; 700; 900; 1200) stopping utilization of the at least one V2X communication service in the second frequency spectrum.

Embodiment 68

The V2X communication device (11, 12, 13, 14, 15; 31, 32, 33, 34, 35, 36, 37, 38, 39, 40; 41, 42, 43; 700; 1200) according to any one of embodiments 64 to 67,
    wherein the selection is performed in response to determining a change of conditions for at least one V2X communication device (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 69

The V2X communication device (11, 12, 13, 14, 15; 31, 32, 33, 34, 35, 36, 37, 38, 39, 40; 41, 42, 43; 700; 1200) according to any one of embodiments 59 to 68,
    wherein the V2X communication device (11, 12, 13, 14, 15; 31, 32, 33, 34, 35, 36, 37, 38, 39, 40; 41, 42, 43; 700; 1200) is configured to receive at least a part of the service information in a V2X communication service in the first frequency spectrum.

Embodiment 70

The V2X communication device (11, 12, 13, 14, 15; 31, 32, 33, 34, 35, 36, 37, 38, 39, 40; 41, 42, 43; 700; 1200) according to any one of embodiments 59 to 69,
    wherein the V2X communication device (11, 12, 13, 14, 15; 31, 32, 33, 34, 35, 36, 37, 38, 39, 40; 41, 42, 43; 700; 1200) is configured to receive at least a part of the service information through a cellular network interface in the first frequency spectrum.

Embodiment 71

The V2X communication device (11, 12, 13, 14, 15; 31, 32, 33, 34, 35, 36, 37, 38, 39, 40; 41, 42, 43; 700; 1200) according to any one of embodiments 59 to 70,
    wherein the V2X communication device (11, 12, 13, 14, 15; 31, 32, 33, 34, 35, 36, 37, 38, 39, 40; 41, 42, 43; 700; 1200) is configured to forward at least a part of the received service information in at least one V2X communication service in the first frequency spectrum.

Embodiment 72

The V2X communication device (11, 12, 13, 14, 15; 31, 32, 33, 34, 35, 36, 37, 38, 39, 40; 41, 42, 43; 700; 1200) according to any one of embodiments 59 to 71,
    wherein the service information indicates a type of the at least one V2X communication service in the second frequency spectrum.

Embodiment 73

The V2X communication device (11, 12, 13, 14, 15; 31, 32, 33, 34, 35, 36, 37, 38, 39, 40; 41, 42, 43; 700; 1200) according to any one of embodiments 59 to 72,
    wherein the service information indicates one or more frequencies utilized for the at least one V2X communication service in the second frequency spectrum.

Embodiment 74

The V2X communication device (11, 12, 13, 14, 15; 31, 32, 33, 34, 35, 36, 37, 38, 39, 40; 41, 42, 43; 700; 1200) according to any one of embodiments 59 to 73,
    wherein the service information indicates a geographic area in which the at least one V2X communication service in the second frequency spectrum is available.

Embodiment 75

The V2X communication device (11, 12, 13, 14, 15; 31, 32, 33, 34, 35, 36, 37, 38, 39, 40; 41, 42, 43; 700; 1200) according to any one of embodiments 59 to 74,
    wherein the service information indicates usage requirements for the at least one V2X communication service in the second frequency spectrum.

Embodiment 76

The V2X communication device (11, 12, 13, 14, 15; 31, 32, 33, 34, 35, 36, 37, 38, 39, 40; 41, 42, 43; 700; 1200) according to any one of embodiments 59 to 75,
    wherein the service information indicates a usage status of the at least one V2X communication service in the second frequency spectrum.

Embodiment 77

The V2X communication device (11, 12, 13, 14, 15; 31, 32, 33, 34, 35, 36, 37, 38, 39, 40; 41, 42, 43; 700; 1200) according to any one of embodiments 59 to 76,
    wherein the at least one V2X communication service in the second frequency spectrum enables coordination of movements by vehicles of a group.

Embodiment 78

The V2X communication device (11, 12, 13, 14, 15; 31, 32, 33, 34, 35, 36, 37, 38, 39, 40; 41, 42, 43; 700; 1200) according to any one of embodiments 59 to 77,
    wherein the at least one V2X communication service in the second frequency spectrum enables sharing of sensor data by vehicles of a group.

Embodiment 79

The V2X communication device (11, 12, 13, 14, 15; 31, 32, 33, 34, 35, 36, 37, 38, 39, 40; 41, 42, 43; 700; 1200) according to any one of embodiments 59 to 78, wherein the V2X communication device (11, 12, 13, 14, 15; 31, 32, 33, 34, 35, 36, 37, 38, 39, 40; 41, 42, 43; 700; 1200) is configured to receive the service information based on a first radio technology and the at least one V2X communication service in the second frequency spectrum is based on a second radio technology which is different from the first radio technology.

Embodiment 80

The V2X communication device (11, 12, 13, 14, 15; 31, 32, 33, 34, 35, 36, 37, 38, 39, 40; 41, 42, 43; 700; 1200) according to any one of embodiments 59 to 79, wherein the first frequency spectrum comprises a dedicated intelligent transport systems (ITS) frequency band.

Embodiment 81

The V2X communication device (11, 12, 13, 14, 15; 31, 32, 33, 34, 35, 36, 37, 38, 39, 40; 41, 42, 43; 700; 1200) according to any one of embodiments 59 to 80, wherein the second frequency spectrum comprises at least one licensed frequency band.

Embodiment 82

The V2X communication device (11, 12, 13, 14, 15; 31, 32, 33, 34, 35, 36, 37, 38, 39, 40; 41, 42, 43; 700; 1200) according to any one of embodiments 59 to 81, wherein the V2X communication device (11, 12, 13, 14, 15; 31, 32, 33, 34, 35, 36, 37, 38, 39, 40; 41, 42, 43; 700; 1200) is configured to perform a method according to any one of embodiments 1 to 23.

Embodiment 83

The V2X communication device (11, 12, 13, 14, 15; 31, 32, 33, 34, 35, 36, 37, 38, 39, 40; 41, 42, 43; 700; 1200) according to any one of embodiments 59 to 82, comprising:

at least one processor (1250), and a memory (1260) containing program code executable by the at least one processor (1250), whereby execution of the program code by the at least one processor (1250) causes the V2X communication device (11, 12, 13, 14, 15; 31, 32, 33, 34, 35, 36, 37, 38, 39, 40; 41, 42, 43; 700; 1200) to perform a method according to any one of embodiments 1 to 23.

Embodiment 84

A vehicle-to-anything, V2X, communication device (11, 12, 13, 14, 15; 31, 32, 33, 34, 35, 36, 37, 38, 39, 40; 41, 42, 43; 900; 1200), the V2X communication device (11, 12, 13, 14, 15; 31, 32, 33, 34, 35, 36, 37, 38, 39, 40; 41, 42, 43; 900; 1200) being configured to:

in a first frequency spectrum, transmit service information to one or more further V2X communication devices (11, 12, 13, 14, 15; 31, 32, 33, 34, 35, 36, 37, 38, 39, 40; 41, 42, 43; 700; 900; 1200), the service information indicating availability of at least one V2X communication service in a second frequency spectrum.

Embodiment 85

The V2X communication device (11, 12, 13, 14, 15; 31, 32, 33, 34, 35, 36, 37, 38, 39, 40; 41, 42, 43; 900; 1200) according to embodiment 84, wherein the V2X communication device (11, 12, 13, 14, 15; 31, 32, 33, 34, 35, 36, 37, 38, 39, 40; 41, 42, 43; 900; 1200) is configured to participate in selection of a V2X communication device for forwarding of information between the at least V2X communication service in the second frequency spectrum and at least one V2X communication service in the first frequency spectrum.

Embodiment 86

The V2X communication device (11, 12, 13, 14, 15; 31, 32, 33, 34, 35, 36, 37, 38, 39, 40; 41, 42, 43; 900; 1200) according to embodiment 85, wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 87

The V2X communication device (11, 12, 13, 14, 15; 31, 32, 33, 34, 35, 36, 37, 38, 39, 40; 41, 42, 43; 900; 1200) according to embodiment 86, wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum relative to positions of one or more V2X communication devices (11, 12, 13, 14, 15; 31, 32, 33, 34, 35, 36, 37, 38, 39, 40; 41, 42, 43; 700; 900; 1200) utilizing the at least one V2X communication service in the first frequency spectrum.

Embodiment 88

The V2X communication device (11, 12, 13, 14, 15; 31, 32, 33, 34, 35, 36, 37, 38, 39, 40; 41, 42, 43; 900; 1200) according to any one of embodiments 85 to 87, wherein the selection is performed in response to a V2X communication device (11, 12, 13, 14, 15; 31, 32, 33, 34, 35, 36, 37, 38, 39, 40; 41, 42, 43; 700; 900; 1200) starting utilization of the at least one V2X communication service in the second frequency spectrum or in response to a V2X communication device (11, 12, 13, 14, 15; 31, 32, 33, 34, 35, 36, 37, 38, 39, 40; 41, 42, 43; 700; 900; 1200) stopping utilization of the at least one V2X communication service in the second frequency spectrum.

Embodiment 89

The V2X communication device (11, 12, 13, 14, 15; 31, 32, 33, 34, 35, 36, 37, 38, 39, 40; 41, 42, 43; 900; 1200) according to any one of embodiments 85 to 88, wherein the selection is performed in response to determining a change of conditions for at least one V2X communication device (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 90

The V2X communication device (11, 12, 13, 14, 15; 31, 32, 33, 34, 35, 36, 37, 38, 39, 40; 41, 42, 43; 900; 1200) according to any one of embodiments 84 to 89,
  wherein the V2X communication device (11, 12, 13, 14, 15; 31, 32, 33, 34, 35, 36, 37, 38, 39, 40; 41, 42, 43; 900; 1200) is configured to transmit at least a part of the service information in a V2X communication service in the first frequency spectrum.

Embodiment 91

The V2X communication device (11, 12, 13, 14, 15; 31, 32, 33, 34, 35, 36, 37, 38, 39, 40; 41, 42, 43; 900; 1200) according to any one of embodiments 84 to 90,
  wherein the V2X communication device (11, 12, 13, 14, 15; 31, 32, 33, 34, 35, 36, 37, 38, 39, 40; 41, 42, 43; 900; 1200) is configured to transmit at least a part of the service information through a cellular network interface in the first frequency spectrum.

Embodiment 92

The V2X communication device (11, 12, 13, 14, 15; 31, 32, 33, 34, 35, 36, 37, 38, 39, 40; 41, 42, 43; 900; 1200) according to any one of embodiments 84 to 91,
  wherein the service information indicates a type of the at least one V2X communication service in the second frequency spectrum.

Embodiment 93

The V2X communication device (11, 12, 13, 14, 15; 31, 32, 33, 34, 35, 36, 37, 38, 39, 40; 41, 42, 43; 900; 1200) according to any one of embodiments 84 to 92,
  wherein the service information indicates one or more frequencies utilized for the at least one V2X communication service in the second frequency spectrum.

Embodiment 94

The V2X communication device (11, 12, 13, 14, 15; 31, 32, 33, 34, 35, 36, 37, 38, 39, 40; 41, 42, 43; 900; 1200) according to any one of embodiments 84 to 93,
  wherein the service information indicates a geographic area in which the at least one V2X communication service in the second frequency spectrum is available.

Embodiment 95

The V2X communication device (11, 12, 13, 14, 15; 31, 32, 33, 34, 35, 36, 37, 38, 39, 40; 41, 42, 43; 900; 1200) according to any one of embodiments 84 to 94,
  wherein the service information indicates usage requirements for the at least one V2X communication service in the second frequency spectrum.

Embodiment 96

The V2X communication device (11, 12, 13, 14, 15; 31, 32, 33, 34, 35, 36, 37, 38, 39, 40; 41, 42, 43; 900; 1200) according to any one of embodiments 84 to 95,
wherein the service information indicates a usage status of the at least one V2X communication service in the second frequency spectrum.

Embodiment 97

The V2X communication device (11, 12, 13, 14, 15; 31, 32, 33, 34, 35, 36, 37, 38, 39, 40; 41, 42, 43; 900; 1200) according to any one of embodiments 84 to 96,
  wherein the at least one V2X communication service in the second frequency spectrum enables coordination of movements by vehicles of a group.

Embodiment 98

The V2X communication device (11, 12, 13, 14, 15; 31, 32, 33, 34, 35, 36, 37, 38, 39, 40; 41, 42, 43; 900; 1200) according to any one of embodiments 84 to 97,
  wherein the at least one V2X communication service in the second frequency spectrum enables sharing of sensor data by vehicles of a group.

Embodiment 99

The V2X communication device (11, 12, 13, 14, 15; 31, 32, 33, 34, 35, 36, 37, 38, 39, 40; 41, 42, 43; 900; 1200) according to any one of embodiments 84 to 98,
  wherein the V2X communication device (11, 12, 13, 14, 15; 31, 32, 33, 34, 35, 36, 37, 38, 39, 40; 41, 42, 43; 900; 1200) is configured to transmit the service information based on a first radio technology and the at least one V2X communication service in the second frequency spectrum is based on a second radio technology which is different from the first radio technology.

Embodiment 100

The V2X communication device (11, 12, 13, 14, 15; 31, 32, 33, 34, 35, 36, 37, 38, 39, 40; 41, 42, 43; 900; 1200) according to any one of embodiments 84 to 99,
  wherein the first frequency spectrum comprises a dedicated intelligent transport systems (ITS) frequency band.

Embodiment 101

The V2X communication device (11, 12, 13, 14, 15; 31, 32, 33, 34, 35, 36, 37, 38, 39, 40; 41, 42, 43; 900; 1200) according to any one of embodiments 84 to 100,
  wherein the second frequency spectrum comprises at least one licensed frequency band.

Embodiment 102

The V2X communication device (11, 12, 13, 14, 15; 31, 32, 33, 34, 35, 36, 37, 38, 39, 40; 41, 42, 43; 900; 1200) according to any one of embodiments 84 to 101,
  wherein the V2X communication device (11, 12, 13, 14, 15; 31, 32, 33, 34, 35, 36, 37, 38, 39, 40; 41, 42, 43; 900; 1200) is configured to perform a method according to any one of embodiments 24 to 41.

Embodiment 103

The V2X communication device (11, 12, 13, 14, 15; 31, 32, 33, 34, 35, 36, 37, 38, 39, 40; 41, 42, 43; 900; 1200) according to any one of embodiments 84 to 103, comprising:

at least one processor (1250), and a memory (1260) containing program code executable by the at least one processor (1250), whereby execution of the program code by the at least one processor (1250) causes the V2X communication device to (11, 12, 13, 14, 15; 31, 32, 33, 34, 35, 36, 37, 38, 39, 40; 41, 42, 43; 900; 1200) perform a method according to any one of embodiments 24 to 41.

Embodiment 104

A node (100; 1300) for a wireless communication network, the node being configured to:

in a first frequency spectrum, transmit service information to one or more vehicle-to-anything, V2X, communication devices (11, 12, 13, 14, 15; 31, 32, 33, 34, 35, 36, 37, 38, 39, 40; 41, 42, 43; 700; 900; 1200), the service information indicating availability of at least one V2X communication service in a second frequency spectrum.

Embodiment 105

The node (100; 1300) according to embodiment 104, wherein the node (100) is configured to participate in selection of a V2X communication device (11, 12, 13, 14, 15; 31, 32, 33, 34, 35, 36, 37, 38, 39, 40; 41, 42, 43; 700; 900; 1200) for forwarding of information between the at least V2X communication service in the second frequency spectrum and at least one V2X communication service in the first frequency spectrum.

Embodiment 106

The node (100; 1300) according to embodiment 105, wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 107

The node (100; 1300) according to embodiment 106, wherein the selection is based on positions of V2X communication devices (11, 12, 13, 14, 15; 31, 32, 33, 34, 35, 36, 37, 38, 39, 40; 41, 42, 43; 700; 900; 1200) utilizing the at least one V2X communication service in the second frequency spectrum relative to positions of one or more V2X communication devices (11, 12, 13, 14, 15; 31, 32, 33, 34, 35, 36, 37, 38, 39, 40; 41, 42, 43; 700; 900; 1200) utilizing the at least one V2X communication service in the first frequency spectrum.

Embodiment 108

The node (100; 1300) according to any one of embodiments 105 to 107, wherein the selection is performed in response to a V2X communication device (11, 12, 13, 14, 15; 31, 32, 33, 34, 35, 36, 37, 38, 39, 40; 41, 42, 43; 700; 900; 1200) starting utilization of the at least one V2X communication service in the second frequency spectrum or in response to a V2X communication device (11, 12, 13, 14, 15; 31, 32, 33, 34, 35, 36, 37, 38, 39, 40; 41, 42, 43;

700; 900; 1200) stopping utilization of the at least one V2X communication service in the second frequency spectrum.

Embodiment 109

The node (100; 1300) according to any one of embodiments 105 to 108, wherein the selection is performed in response to determining a change of conditions for at least one V2X communication device (11, 12, 13, 14, 15; 31, 32, 33, 34, 35, 36, 37, 38, 39, 40; 41, 42, 43; 700; 900; 1200) utilizing the at least one V2X communication service in the second frequency spectrum.

Embodiment 110

The node (100; 1300) according to any one of embodiments 104 to 109, wherein the node (100; 1300) transmits at least a part of the service information in through a cellular network interface in the first frequency spectrum.

Embodiment 111

The node (100; 1300) according to any one of embodiments 104 to 110, wherein the service information indicates a type of the at least one V2X communication service in the second frequency spectrum.

Embodiment 112

The node (100; 1300) according to any one of embodiments 104 to 111, wherein the service information indicates one or more frequencies utilized for the at least one V2X communication service in the second frequency spectrum.

Embodiment 113

The node (100; 1300) according to any one of embodiments 104 to 112, wherein the service information indicates a geographic area in which the at least one V2X communication service in the second frequency spectrum is available.

Embodiment 114

The node (100; 1300) according to any one of embodiments 104 to 113, wherein the service information indicates usage requirements for the at least one V2X communication service in the second frequency spectrum.

Embodiment 115

The node (100; 1300) according to any one of embodiments 104 to 114, wherein the service information indicates a usage status of the at least one V2X communication service in the second frequency spectrum.

Embodiment 116

The node (100; 1300) according to any one of embodiments 104 to 115,
  wherein the at least one V2X communication service in the second frequency spectrum enables coordination of movements by vehicles of a group.

Embodiment 117

The node (100; 1300) according to any one of embodiments 104 to 116,
  wherein the at least one V2X communication service in the second frequency spectrum enables sharing of sensor data by vehicles of a group.

Embodiment 118

The node (100; 1300) according to any one of embodiments 104 to 117,
  wherein the node (100; 1300) is configured to transmit the service information based on a first radio technology and the at least one V2X communication service in the second frequency spectrum is based on a second radio technology which is different from the first radio technology.

Embodiment 119

The node (100; 1300) according to any one of embodiments 104 to 118,
  wherein the first frequency spectrum comprises a dedicated intelligent transport systems (ITS) frequency band.

Embodiment 120

The node (100; 1300) according to any one of embodiments 104 to 119,
  wherein the second frequency spectrum comprises at least one licensed frequency band.

Embodiment 121

The node (100; 1300) according to any one of embodiments 104 to 120,
  wherein the node (100; 1300) is configured to perform a method according to any one of embodiments 42 to 58.

Embodiment 122

The node (100; 1300) according to any one of embodiments 104 to 121, comprising:
  at least one processor (1350), and
  a memory (1360) containing program code executable by the at least one processor (1350), whereby execution of the program code by the at least one processor (1350) causes the node (100; 1300) to perform a method according to any one of embodiments 42 to 58.

Embodiment 123

A system, comprising:
  at least one vehicle-to-anything, V2X, communication device (11, 12, 13, 14, 15; 31, 32, 33, 34, 35, 36, 37, 38, 39, 40; 41, 42, 43; 700; 1200), the V2X communication device (11, 12, 13, 14, 15; 31, 32, 33, 34, 35, 36, 37, 38, 39, 40; 41, 42, 43; 700; 1200) being configured to:
    receive service information in a first frequency spectrum, the service information indicating availability of at least one V2X communication service in a second frequency spectrum; and
    based on the received service information, control utilization of one or more V2X communication services by the V2X communication device (11, 12, 13, 14, 15; 31, 32, 33, 34, 35, 36, 37, 38, 39, 40; 41, 42, 43; 700; 1200), and
  at least one further V2X communication device (11, 12, 13, 14, 15; 31, 32, 33, 34, 35, 36, 37, 38, 39, 40; 41, 42, 43; 900; 1200), the at least one further V2X communication device (11, 12, 13, 14, 15; 31, 32, 33, 34, 35, 36, 37, 38, 39, 40; 41, 42, 43; 900; 1200) being configured to transmit at least a part of the service information, and/or
  at least one node (100; 1300) for a wireless communication network, the at least one node being configured to transmit at least a part of the service information.

Embodiment 124

The system according to embodiment 123,
  wherein the at least one V2X communication device (11, 12, 13, 14, 15; 31, 32, 33, 34, 35, 36, 37, 38, 39, 40; 41, 42, 43; 700; 900; 1200) is configured to perform a method according to any one of embodiments 1 to 23, and/or
  wherein the at least one further V2X communication device (11, 12, 13, 14, 15; 31, 32, 33, 34, 35, 36, 37, 38, 39, 40; 41, 42, 43; 900; 1200) is configured to perform a method according to any one of embodiments 24 to 41, and/or
  wherein the at least one node (100; 1300) is configured to perform a method according to any one of embodiments 42 to 58.

Embodiment 125

A computer program comprising program code to be executed by at least one processor (1250) of a vehicle-to-anything, V2X, communication device (11, 12, 13, 14, 15; 31, 32, 33, 34, 35, 36, 37, 38, 39, 40; 41, 42, 43; 700; 900; 1200), whereby execution of the program code causes the V2X communication device (11, 12, 13, 14, 15; 31, 32, 33, 34, 35, 36, 37, 38, 39, 40; 41, 42, 43; 700; 900; 1200) to perform a method according to any one of embodiments 1 to 41.

Embodiment 126

A computer program product comprising program code to be executed by at least one processor (1250) of a vehicle-to-anything, V2X, communication device (11, 12, 13, 14, 15; 31, 32, 33, 34, 35, 36, 37, 38, 39, 40; 41, 42, 43; 700; 900; 1200), whereby execution of the program code causes the V2X communication device (11, 12, 13, 14, 15; 31, 32, 33, 34, 35, 36, 37, 38, 39, 40; 41, 42, 43; 700; 900; 1200) to perform a method according to any one of embodiments 1 to 41.

Embodiment 127

A computer program comprising program code to be executed by at least one processor (1350) of a node (100; 1300) for a wireless communication network, whereby execution of the program code causes the node (100; 1300) to perform a method according to any one of embodiments 42 to 58.

Embodiment 128

A computer program product comprising program code to be executed by at least one processor (1350) of a node (100) for a wireless communication network, whereby execution of the program code causes the node (100; 1300) to perform a method according to any one of embodiments 42 to 58.

The invention claimed is:

1. A method of controlling vehicle-to-anything (V2X) communication, the method comprising a V2X communication device:

receiving service information in a dedicated intelligent transport systems (ITS) first frequency band, the service information advertising at least one V2X communication service in at least one licensed frequency band, the service information comprising a geographic area in which the at least one V2X communication service in the at least one licensed frequency band is available and at least one of:

a type of the at least one V2X communication service in the at least one licensed frequency band; and one or more frequencies utilized for the at least one V2X communication service in the at least one licensed frequency band;

forwarding at least part of the service information in the dedicated ITS frequency band;

controlling, based on the received service information, utilization of one or more V2X communication services by the V2X communication device, the controlling comprising selecting delegates among V2X communication devices using a same V2X communication service in a group of enhanced V2X (eV2X) communication devices in which the delegates are only allowed to transmit basic ITS service messages in the dedicated ITS frequency band to continue utilization of V2X services in the first frequency band while other eV2X communication devices discontinue utilizing V2X communication services in the first frequency band;

checking if the V2X communication device was selected as a delegate for forwarding of messages or information between the V2X communication service and the eV2X service and:

if the V2X communication device was selected as a delegate for forwarding of messages or information between the V2X communication service and the eV2X service, utilizing the V2X communication service on behalf of one or more other users of the eV2X service; or if the V2X communication device was not selected as a delegate for forwarding of messages or information between the V2X communication service and the eV2X service, leaving the V2X communication service;

deciding whether to leave the eV2X service based on at least one of updated service information received by the V2X communication device and a detected change of a condition; and the selecting of delegates being performed one or more of: based on relative positions of the vehicles within the group of eV2X communication devices, in relation to other communication devices utilizing another eV2X or V2X service, in a distributed manner, or in a centralized manner.

2. The method of claim 1, wherein the method comprises the V2X communication device:

starting, based on the received service information, utilization of the at least one V2X communication service in the at least one licensed frequency band; or stopping utilization of at least one V2X communication service in the dedicated ITS frequency band.

3. The method of claim 2, wherein the method comprises the V2X communication device participating in selection of a V2X communication device for forwarding of information between the at least one V2X communication service in the at least one licensed frequency band and at least one V2X communication service in the dedicated ITS frequency band.

4. The method of claim 3, wherein the selection is based on:

positions of V2X communication devices utilizing the at least one V2X communication service in the at least one licensed frequency band; and positions of V2X communication devices utilizing the at least one V2X communication service in the at least one licensed frequency band relative to positions of one or more V2X communication devices utilizing the at least one V2X communication service in the dedicated ITS frequency band.

5. The method of claim 1, wherein the service information indicates:

usage requirements for the at least one V2X communication service in the at least one licensed frequency band; and/or a usage status of the at least one V2X communication service in the at least one licensed frequency band.

6. The method of claim 1, wherein the at least one V2X communication service in the at least one licensed frequency band enables:

coordination of movements by vehicles of a group; and/or sharing of sensor data by vehicles of a group.

7. The method of claim 1:

wherein the V2X communication device receives the service information based on a first radio technology; and wherein the at least one V2X communication service in the at least one licensed frequency band is based on a second radio technology which is different from the first radio technology.

8. A method of controlling vehicle-to-anything (V2X) communication, the method comprising:

in a first dedicated intelligent transport systems (ITS) frequency band, a V2X communication device transmitting service information to one or more further V2X communication devices, the service information advertising at least one V2X communication service in a at least one licensed frequency band, the service information comprising a geographic area in which the at least one V2X communication service in the at least one licensed frequency band is available and at least one of:

a type of the at least one V2X communication service in the at least one licensed frequency band; and one or more frequencies utilized for the at least one V2X communication service in the at least one licensed frequency band;

participating in a selection of a V2X communication device for forwarding of information between the at least one V2X communication service in the at least one licensed frequency band and at least one V2X communication service in the dedicated ITS frequency band, the selected V2X communication device only being allowed to transmit basic ITS service messages in the dedicated ITS frequency band to continue utilization of V2X services in the first frequency band while other enhanced V2X communication devices discontinue utilizing V2X communication services in the first frequency band;

checking if the V2X communication device was selected as a delegate for forwarding of messages or information between the V2X communication service and the eV2X service and:

if the V2X communication device was selected as a delegate for forwarding of messages or information between the V2X communication service and the eV2X service, utilizing the V2X communication service on behalf of one or more other users of the eV2X service; or if the V2X communication device was not selected as a delegate for forwarding of messages or information between the V2X communication service and the eV2X service, leaving the V2X communication service;

deciding whether to leave the eV2X service based on at least one of updated service information received by the V2X communication device and a detected change of a condition; and the selection of delegates being performed one or more of:

based on relative positions of the vehicles within a group of eV2X communication devices, in relation to other communication devices utilizing another eV2X or V2X service, in a distributed manner, or in a centralized manner.

9. The method of claim 8, wherein the selection is based on:

positions of V2X communication devices utilizing the at least one V2X communication service in the at least one licensed frequency band; and positions of V2X communication devices utilizing the at least one V2X communication service in the at least one licensed frequency band relative to positions of one or more V2X communication devices utilizing the at least one V2X communication service in the dedicated ITS frequency band.

10. The method of claim 8, wherein the service information indicates:

usage requirements for the at least one V2X communication service in the at least one licensed frequency band; and/or a usage status of the at least one V2X communication service in the at least one licensed frequency band.

11. The method of claim 8, wherein the at least one V2X communication service in the at least one licensed frequency band enables:

coordination of movements by vehicles of a group; and/or sharing of sensor data by vehicles of a group.

12. The method of claim 8:

wherein the V2X communication device transmits the service information based on a first radio technology; and wherein the at least one V2X communication service in the at least one licensed frequency band is based on a second radio technology which is different from the first radio technology.

13. A vehicle-to-anything (V2X) communication device, the V2X communication device comprising:

processing circuitry;

memory containing instructions executable by the processing circuitry whereby the device is operative to:

receive service information in a first dedicated intelligent transport systems (ITS) frequency band, the service information advertising at least one V2X communication service in at least one licensed frequency band, wherein the service information comprising one or more of:

a type of the at least one V2X communication service in the at least one licensed frequency band;

one or more frequencies utilized for the at least one V2X communication service in the at least one licensed frequency band; and a geographic area in which the at least one V2X communication service in the at least one licensed frequency band is available;

forward at least part of the service information in the dedicated ITS frequency band;

control, based on the received service information, utilization of one or more V2X communication services by the V2X communication device, the controlling comprising selecting delegates among V2X communication devices using a same V2X communication service in a group of enhanced V2X (eV2X) communication devices in which the delegates are only allowed to transmit basic ITS service messages in the dedicated ITS frequency band to continue utilization of V2X services in the first frequency band while other eV2X communication devices discontinue utilizing V2X communication services in the first frequency band;

check if the V2X communication device was selected as a delegate for forwarding of messages or information between the V2X communication service and the eV2X service and:

if the V2X communication device was selected as a delegate for forwarding of messages or information between the V2X communication service and the eV2X service, utilizing the V2X communication service on behalf of one or more other users of the eV2X service; or if the V2X communication device was not selected as a delegate for forwarding of messages or information between the V2X communication service and the eV2X service, leaving the V2X communication service;

decide whether to leave the eV2X service based on at least one of updated service information received by the V2X communication device and a detected change of a condition; and the selecting of delegates being performed one or more of: based on relative positions of the vehicles within the group of eV2X communication devices, in relation to other communication devices utilizing another eV2X or V2X service, in a distributed manner, or in a centralized manner.

14. The V2X communication device of claim 13, wherein the instructions are such that the V2X communication device is operative to:

start, based on the received service information, utilization of the at least one V2X communication service in the at least one licensed frequency band; or stop utilization of at least one V2X communication service in the dedicated ITS frequency band.

15. The V2X communication device of claim 13, wherein the at least one V2X communication service in the at least one licensed frequency band enables:

coordination of movements by vehicles of a group; and/or sharing of sensor data by vehicles of a group.

16. The V2X communication device of claim 13:

wherein the instructions are such that the V2X communication device is operative to receive the service information based on a first radio technology; and wherein the at least one V2X communication service in the at least one licensed frequency band is based on a second radio technology which is different from the first radio technology.

17. A vehicle-to-anything, V2X, communication device, the V2X communication device comprising:

processing circuitry;

memory containing instructions executable by the processing circuitry whereby the device is operative to:

transmit, in a first dedicated intelligent transport systems (ITS) frequency band, service information to one or more further V2X communication devices, the service information advertising at least one V2X communication service in a at least one licensed frequency band, the service information comprising a geographic area in which the at least one V2X communication service in the at least one licensed frequency band is available and at least one of:

a type of the at least one V2X communication service in the at least one licensed frequency band; and one or more frequencies utilized for the at least one V2X communication service in the at least one licensed frequency band; and participate in a selection of a V2X communication device for forwarding of information between the at least V2X communication service in the at least one licensed frequency band and at least one V2X communication service in the dedicated ITS frequency band, the selected V2X communication device only being allowed to transmit basic ITS service messages in the dedicated ITS frequency band to continue utilization of V2X services in the first frequency band while other eV2X communication devices discontinue utilizing V2X communication services in the first frequency band;

check if the V2X communication device was selected as a delegate for forwarding of messages or information between the V2X communication service and the eV2X service and:

if the V2X communication device was selected as a delegate for forwarding of messages or information between the V2X communication service and the eV2X service, utilizing the V2X communication service on behalf of one or more other users of the eV2X service; or if the V2X communication device was not selected as a delegate for forwarding of messages or information between the V2X communication service and the eV2X service, leaving the V2X communication service;

decide whether to leave the eV2X service based on at least one of updated service information received by the V2X communication device and a detected change of a condition; and the selection of delegates being performed one or more of:

based on relative positions of the vehicles within a group of eV2X communication devices, in relation to other communication devices utilizing another eV2X or V2X service, in a distributed manner, or in a centralized manner.

18. The V2X communication device of claim 17, wherein the at least one V2X communication service in the at least one licensed frequency band enables:

coordination of movements by vehicles of a group; and/or sharing of sensor data by vehicles of a group.

19. A non-transitory computer readable recording medium storing a computer program product for controlling a vehicle-to-anything (V2X) communication device, the computer program product comprising program instructions which, when run on processing circuitry of the V2X communication device, causes the V2X communication device to:

receive service information in a first dedicated intelligent transport systems (ITS) frequency band, the service information advertising at least one V2X communication service in at least one licensed frequency band, the service information comprising a geographic area in which the at least one V2X communication service in the at least one licensed frequency band is available and at least one of:

a type of the at least one V2X communication service in the at least one licensed frequency band;

one or more frequencies utilized for the at least one V2X communication service in the at least one licensed frequency band;

forward at least part of the service information in the dedicated ITS frequency band;

control, based on the received service information, utilization of one or more V2X communication services by the V2X communication device, the controlling comprising selecting delegates among V2X communication devices using a same V2X communication service in a group of enhanced V2X (eV2X) communication devices in which the delegates are only allowed to transmit basic ITS service messages in the dedicated ITS frequency band to continue utilization of V2X services in the first frequency band while other eV2X communication devices discontinue utilizing V2X communication services in the first frequency band;

check if the V2X communication device was selected as a delegate for forwarding of messages or information between the V2X communication service and the eV2X service and:

if the V2X communication device was selected as a delegate for forwarding of messages or information between the V2X communication service and the eV2X service, utilizing the V2X communication service on behalf of one or more other users of the eV2X service; or if the V2X communication device was not selected as a delegate for forwarding of messages or information between the V2X communication service and the eV2X service, leaving the V2X communication service;

decide whether to leave the eV2X service based on at least one of updated service information received by the V2X communication device and a detected change of a condition; and the selecting of delegates being performed one or more of:

based on relative positions of the vehicles within the group of eV2X communication devices, in relation to other communication devices utilizing another eV2X or V2X service, in a distributed manner, or in a centralized manner.

20. A non-transitory computer readable recording medium storing a computer program product for controlling a vehicle-to-anything (V2X) communication device, the computer program product comprising program instructions which, when run on processing circuitry of the V2X communication device, causes the V2X communication device to:

transmit, in a first dedicated intelligent transport systems (ITS) frequency band, service information to one or more further V2X communication devices, the service information advertising at least one V2X communication service in a at least one licensed frequency band, wherein the service information comprising a geographic area in which the at least one V2X communication service in the at least one licensed frequency band is available and at least one of:

a type of the at least one V2X communication service in the at least one licensed frequency band; and one or more frequencies utilized for the at least one V2X communication service in the at least one licensed frequency band;

participate in a selection of a V2X communication device for forwarding of information between the at least V2X communication service in the at least one licensed frequency band and at least one V2X communication service in the dedicated ITS frequency band, the selected V2X communication device only being allowed to transmit basic ITS service messages in the dedicated ITS frequency band to continue utilization of V2X services in the first frequency band while other eV2X communication devices discontinue utilizing V2X communication services in the first frequency band;

check if the V2X communication device was selected as a delegate for forwarding of messages or information between the V2X communication service and the eV2X service and:

if the V2X communication device was selected as a delegate for forwarding of messages or information between the V2X communication service and the eV2X service, utilizing the V2X communication service on behalf of one or more other users of the eV2X service; or if the V2X communication device was not selected as a delegate for forwarding of messages or information between the V2X communication service and the eV2X service, leaving the V2X communication service;

decide whether to leave the eV2X service based on at least one of updated service information received by the V2X communication device and a detected change of a condition; and the selection of delegates being performed one or more of: based on relative positions of the vehicles within a group of eV2X communication devices, in relation to other communication devices utilizing another eV2X or V2X service, in a distributed manner, or in a centralized manner.

* * * * *